US010251165B2

(12) United States Patent
Seo et al.

(10) Patent No.: US 10,251,165 B2
(45) Date of Patent: Apr. 2, 2019

(54) METHOD AND APPARATUS FOR RESOURCE MAPPING FOR PHYSICAL CHANNEL IN MULTIPLE CELL SYSTEM

(71) Applicant: LG ELECTRONICS INC., Seoul (KR)

(72) Inventors: Hanbyul Seo, Anyang-si (KR); Inkwon Seo, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 14/361,639

(22) PCT Filed: Dec. 17, 2012

(86) PCT No.: PCT/KR2012/011002
§ 371 (c)(1),
(2) Date: May 29, 2014

(87) PCT Pub. No.: WO2013/089531
PCT Pub. Date: Jun. 20, 2013

(65) Prior Publication Data
US 2015/0117291 A1   Apr. 30, 2015

Related U.S. Application Data

(60) Provisional application No. 61/576,358, filed on Dec. 16, 2011, provisional application No. 61/649,873, (Continued)

(51) Int. Cl.
*H04W 72/04* (2009.01)
*H04L 5/00* (2006.01)
(Continued)

(52) U.S. Cl.
CPC .......... *H04W 72/042* (2013.01); *H04L 5/001* (2013.01); *H04L 5/0016* (2013.01);
(Continued)

(58) Field of Classification Search
None
See application file for complete search history.

(56) References Cited

U.S. PATENT DOCUMENTS

| 2008/0163002 A1 | 7/2008 | Frederiksen |
| 2010/0149961 A1* | 6/2010 | Lee .................... H04L 5/0007 370/204 |

(Continued)

FOREIGN PATENT DOCUMENTS

| CN | 102273125 A | 12/2011 |
| KR | 10-2010-0137357 A1 | 12/2010 |

(Continued)

OTHER PUBLICATIONS

Research in Motion et al., "4-tx Transmission Configuration in LTE-A," 3GPP TSG RAN WG1 Meeting #58, Aug. 24-28, 2009, pp. 1-5, R1-093284, XP50351610.

*Primary Examiner* — Kashif Siddiqui
*Assistant Examiner* — Mehedi S Aley
(74) *Attorney, Agent, or Firm* — Birch, Stewart, Kolasch & Birch, LLP

(57) ABSTRACT

The present invention relates to a wireless communication system. More particularly, provided is a method for determining a resource allocation scheme, related reference signals, transmission timing, transmission power, scrambling and the like for a physical channel so that a terminal can receive in an accurate and efficient manner the physical channel transmitted in a multiple cell environment.

5 Claims, 15 Drawing Sheets

Related U.S. Application Data filed on May 21, 2012, provisional application No. 61/654,056, filed on May 31, 2012, provisional application No. 61/673,230, filed on Jul. 18, 2012.

(51) Int. Cl.
  *H04W 72/00* (2009.01)
  *H04B 7/024* (2017.01)
  *H04B 7/0417* (2017.01)

(52) U.S. Cl.
  CPC .......... *H04L 5/0035* (2013.01); *H04L 5/0048* (2013.01); *H04L 5/0053* (2013.01); *H04L 5/0073* (2013.01); *H04W 72/005* (2013.01); *H04B 7/024* (2013.01); *H04B 7/0417* (2013.01); *H04L 5/0051* (2013.01)

(56) References Cited

U.S. PATENT DOCUMENTS

| | | | | |
|---|---|---|---|---|
| 2010/0177746 | A1* | 7/2010 | Gorokhov | H04B 7/024 370/336 |
| 2010/0238821 | A1* | 9/2010 | Liu | H04L 43/045 370/252 |
| 2010/0323684 | A1 | 12/2010 | Cai et al. | |
| 2011/0044250 | A1 | 2/2011 | Han et al. | |
| 2011/0110219 | A1* | 5/2011 | Nam | H04J 13/0003 370/209 |
| 2012/0099536 | A1* | 4/2012 | Lee | H04W 72/005 370/328 |
| 2012/0134338 | A1 | 5/2012 | Ko et al. | |
| 2012/0176884 | A1* | 7/2012 | Zhang | H04B 7/024 370/203 |
| 2013/0021991 | A1 | 1/2013 | Ko et al. | |
| 2013/0114431 | A1* | 5/2013 | Koivisto | H04B 7/024 370/252 |
| 2013/0114496 | A1* | 5/2013 | Mazzarese | H04L 5/0023 370/312 |

FOREIGN PATENT DOCUMENTS

| | | |
|---|---|---|
| KR | 10-2011-0021697 A | 3/2011 |
| KR | 10-2011-0086523 A | 7/2011 |
| KR | 10-2011-0132633 A | 12/2011 |
| WO | WO 2010/098581 A2 | 9/2010 |
| WO | WO 2010/151000 A2 | 12/2010 |

* cited by examiner

FIG. 11

Pcell CRS in PDCCH — Scell1 CRS in PDSCH (a)

|    | l=0   | 1     | 2 | 3     | 4     | 5 | 6     | 7     | 8     | 9 | 10    | 11    | 12 | 13 |
|----|-------|-------|---|-------|-------|---|-------|-------|-------|---|-------|-------|----|----|
| 11 |       |       |   |       |       |   |       |       |       |   |       |       |    |    |
| 10 |       |       |   |       | R0(S1)|   |       | R1(S1)|       |   |       | R0(S1)|    |    |
| 9  | R1(P) | R3(P) |   |       | R0(P) |   |       | R0(P) | R2(P) |   |       | R0(P) |    |    |
| 8  |       |       |   |       |       |   |       |       |       |   |       |       |    |    |
| 7  |       |       |   |       | R1(S1)|   |       | R0(S1)|       |   |       | R1(S1)|    |    |
| 6  | R0(P) | R2(P) |   |       | R1(P) |   |       | R1(P) | R3(P) |   |       | R1(P) |    |    |
| 5  |       |       |   |       |       |   |       |       |       |   |       |       |    |    |
| 4  |       |       |   |       | R0(S1)|   |       | R1(S1)|       |   |       | R0(S1)|    |    |
| 3  | R1(P) | R3(P) |   |       | R0(P) |   |       | R0(P) | R2(P) |   |       | R0(P) |    |    |
| 2  |       |       |   |       |       |   |       |       |       |   |       |       |    |    |
| 1  |       |       |   |       | R1(S1)|   |       | R0(S1)|       |   |       | R1(S1)|    |    |
| k=0| R0(P) | R2(P) |   |       | R1(P) |   |       | R1(P) | R3(P) |   |       | R1(P) |    |    |

Pcell CRS in PDCCH     Scell1 CRS in PDSCH

METHOD AND APPARATUS FOR RESOURCE MAPPING FOR PHYSICAL CHANNEL IN MULTIPLE CELL SYSTEM

This application is the National Phase of PCT/KR2012/011002 filed on Dec. 17, 2012, which claims priority under 35 U.S.C. 119(e) to U.S. Provisional Application Nos. 61/576,358 filed on Dec. 16, 2011, 61/649,873 filed on May 21, 2012, 61/654,056 filed on May 31, 2012 and 61/673,230 filed on Jul. 18, 2012, all of which are hereby expressly incorporated by reference into the present application.

DESCRIPTION

Technical Field

Embodiments of the present invention relate to a wireless communication system, and more particularly to a method and apparatus for mapping resources to a physical channel in a multi-cell system.

Background Art

MIMO (multiple-input multiple-output) refers to a method for improving data transmission/reception efficiency by adopting multiple transmit (Tx) antennas and multiple receive (Rx) antennas rather than using a single Tx antenna and a single Rx antenna. A receiving side receives data through a single antenna path when a single antenna is used, whereas the receiving side receives data through multiple paths when multiple antennas are used. Accordingly, MIMO may increase data transfer rate and throughput and improve coverage. Single-cell MIMO may be classified into single user MIMO (SU-MIMO) in which a single user equipment (UE) receives a downlink signal in a single cell and multi-user MIMO (MU-MIMO) in which two or more UEs receive downlink signals in a single cell.

Meanwhile, a coordinated multipoint (CoMP) system for improving throughput of a UE located at a cell edge by applying improved MIMO to a multi-cell environment is being studied. The CoMP system may reduce inter-cell interference in a multi-cell environment and improve system performance.

A CoMP scheme may be classified into, for example, a Joint Processing (JP) scheme in which downlink data to be transmitted to a specific UE is shared by all of CoMP coordinated cells and a Coordinated BeamForming (CBF) scheme in which downlink data exists only in one cell.

DISCLOSURE

Technical Problem

An object of the present invention is to provide a resource allocation method for a physical channel, and a method for deciding a variety of attributes, for example, associated reference signals, transmit (Tx) timing point, Tx power, scrambling, etc. in such a manner that a user equipment (UE) can correctly and efficiently receive the physical channel in a multi-cell environment.

It is to be understood that technical objects to be achieved by the present invention are not limited to the aforementioned technical objects and other technical objects which are not mentioned herein will be apparent from the following description to one of ordinary skill in the art to which the present invention pertains Technical Solution The object of the present invention can be achieved by providing a method for receiving a downlink channel from at least one transmit (Tx) point from among a plurality of transmit (Tx) points by a user equipment (UE) including: receiving information related to a resource mapping position of a downlink data channel; and receiving data that is transferred from the at least one Tx point at a downlink subframe on the downlink data channel, and demodulating the downlink data channel based on the resource mapping position related information of the downlink data channel, wherein, if the downlink subframe is an Multicast Broadcast Single Frequency Network (MBSFN) subframe of a first transmit (Tx) point from among the plurality of Tx points, the downlink data channel is demodulated based on a UE-specific reference signal, if the downlink subframe is a non-MBSFN subframe of the first Tx point, the downlink data channel is demodulated based on a cell-specific reference signal, and the first Tx point is a transmit (Tx) point for the UE configured to transmit scheduling information of the downlink data channel.

In accordance with another aspect of the present invention, a user equipment (UE) device for receiving a downlink channel from at least one transmit (Tx) point from among a plurality of transmit (Tx) points includes: a transmission (Tx) module; a reception (Rx) module; and a processor, wherein the processor receives information related to a resource mapping position of a downlink data channel using the Rx module, receives data that is transferred from the at least one Tx point at a downlink subframe on the downlink data channel using the Rx module, and demodulates the downlink data channel based on the resource mapping position related information of the downlink data channel, wherein, if the downlink subframe is an Multicast Broadcast Single Frequency Network (MBSFN) subframe of a first transmit (Tx) point from among the plurality of Tx points, the downlink data channel is demodulated based on a UE-specific reference signal, if the downlink subframe is a non-MBSFN subframe of the first Tx point, the downlink data channel is demodulated based on a cell-specific reference signal, and the first Tx point is a transmit (Tx) point for the UE configured to transmit scheduling information of the downlink data channel.

The following description may be commonly applied to the embodiments of the present invention.

If the downlink subframe is an MBSFN subframe of the first Tx point, and if the resource mapping position related information indicates demodulation of the downlink data channel on an assumption of a position of a cell-specific reference signal of a second Tx point, the downlink data channel is demodulated on the assumption that the downlink data channel is not mapped to a resource element (RE) position of a cell-specific reference signal of the second Tx point.

If the downlink subframe is a non-MBSFN subframe of the first Tx point, and if the resource mapping position related information indicates demodulation of the downlink data channel on an assumption of a position of a cell-specific reference signal of a second Tx point, the downlink data channel is demodulated on the assumption that the resource mapping position related information is discarded and the downlink data channel is not mapped to a resource element (RE) position of a cell-specific reference signal of the first Tx point.

The plurality of Tx points are transmit (Tx) points composed of candidates of data transmission toward the user equipment (UE).

The scheduling information is provided through a downlink control information (DCI) format 1A.

If the at least one Tx point does not include the first Tx point, and if the at least one Tx point includes the first Tx point, scheduling information for the UE is transmitted at the first Tx point.

First information for indicating a position of a cell-specific reference signal assumed by the UE during demodulation of the downlink data channel, and second information for indicating either a position of a cell-specific reference signal of the at least one cell transmitting the downlink data channel or a position of a cell-specific reference signal acting as a measurement target of Doppler spread are signaled to the user equipment (UE) separately from each other.

A position of a resource element (RE) mapped to each cell-specific reference signal of each transmit (Tx) point at which the downlink subframe from among the plurality of Tx points is set to a non-MBSFN subframe, is determined based on the resource mapping position related information of the downlink data channel.

Assuming that the downlink data channel is not mapped to the position of resource element (RE) mapped to a cell-specific reference signal of each determined Tx point, the downlink data channel is demodulated.

Through higher layer signaling, the user equipment (UE) is established in a transmit (Tx) mode in which the downlink data channel is demodulated based on a UE-specific reference signal.

The resource mapping position related information of the downlink data channel indicates one or more combinations of identification (ID) information of the plurality of Tx points, a cell-specific reference signal resource element (RE) position of the plurality of Tx points, an RE position to which the downlink data channel is not allocated, a rate matching pattern of the downlink data channel, a seed value of a scrambling sequence of the downlink data channel, a seed value of sequence generation of a reference signal used for demodulation of the downlink data channel, a transmit (Tx) timing reference of the downlink data channel, and Tx power information of the downlink data channel.

If the resource mapping position related information of the downlink data channel indicates information regarding all or some Tx points from among the plurality of Tx points, demodulation of the downlink data channel is performed based on information regarding the first Tx point from among the all or some Tx points.

If the resource mapping position related information of the downlink data channel indicates information regarding a virtual transmit (Tx) point corresponding to all or some Tx points from among the plurality of Tx points, demodulation of the downlink data channel is performed based on information regarding the virtual Tx point.

The resource mapping position related information of the downlink data channel is used to demodulate an enhanced—control channel mapped to a data region of the downlink subframe.

It is to be understood that both the foregoing general description and the following detailed description of the present invention are exemplary and explanatory and are intended to provide further explanation of the invention as claimed.

Advantageous Effects

As is apparent from the above description, exemplary embodiments of the present invention provide a resource allocation method for a physical channel, and a method for deciding a variety of attributes (for example, associated reference signals, transmit (Tx) timing point, Tx power, scrambling, etc.) in such a manner that a user equipment (UE) can correctly and efficiently receive the physical channel in a multi-cell environment.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 11 is a conceptual diagram illustrating CRS overhead for use in physical channel demodulation according to the embodiment.

FIG. 14 exemplarily shows mapping positions of CRSs of two cells in case of CoMP JT.

BEST MODE

Figure 1:
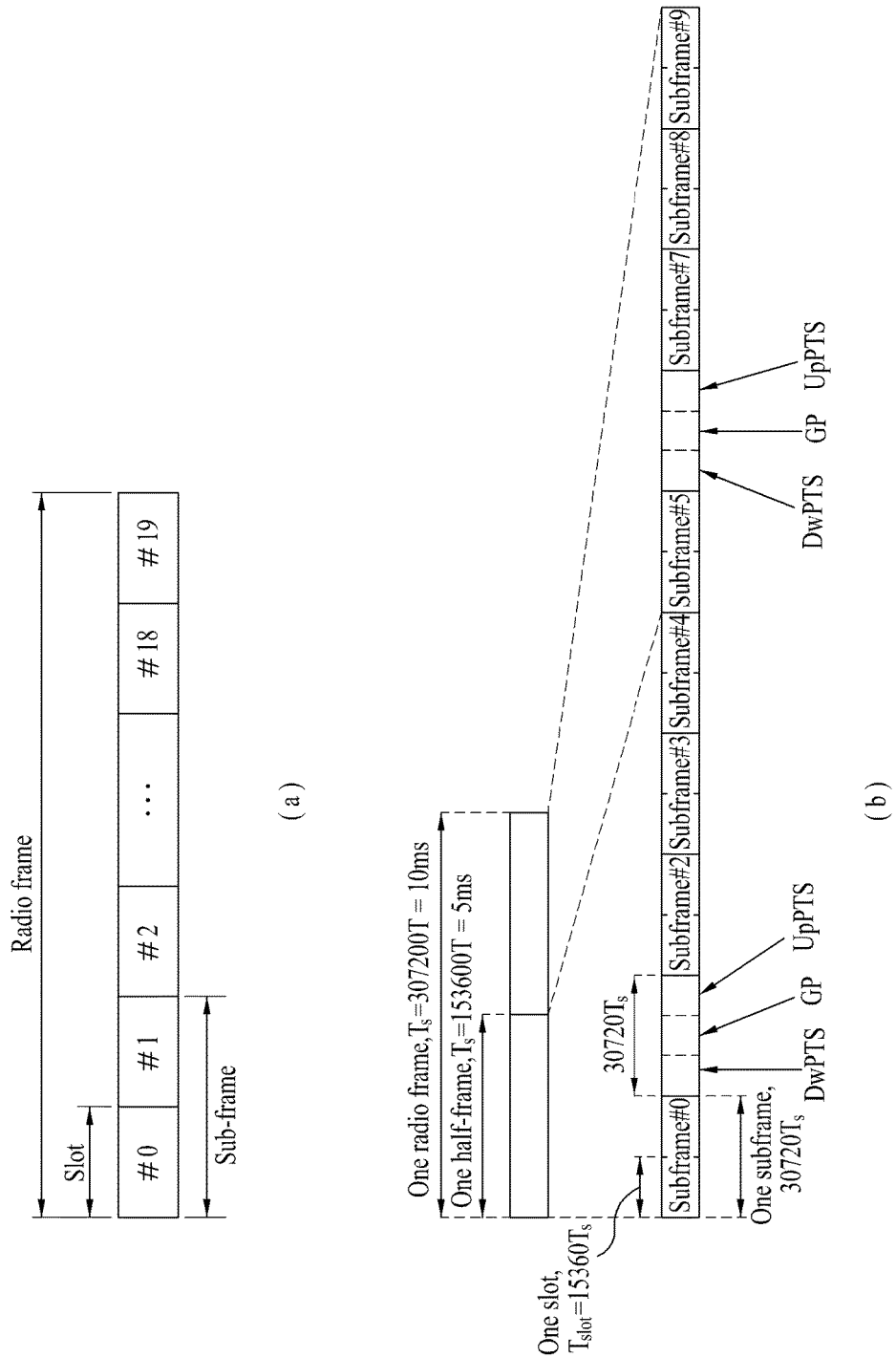
FIG. 1 exemplarily shows a downlink radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with the terms Relay Node (RN) or Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

Radio Frame Structure

A structure of a radio frame is explained with reference to FIG. 1.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 1 (a) is a diagram for a structure of a type 1 radio frame. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 1 (b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or a channel estimation in a user equipment. The UpPTS is used for channel estimation of a base station and matching a transmission synchronization of a user equipment. The guard period is a period for eliminating interference generated in uplink due to multi-path delay of a downlink signal between uplink and downlink. Meanwhile, one subframe includes 2 slots irrespective of a type of a radio frame.

The above-described structures of the radio frame are exemplary only. And, the number of subframes included in a radio frame, the number of slots included in the subframe and the number of symbols included in the slot may be modified in various ways.

Figure 2:
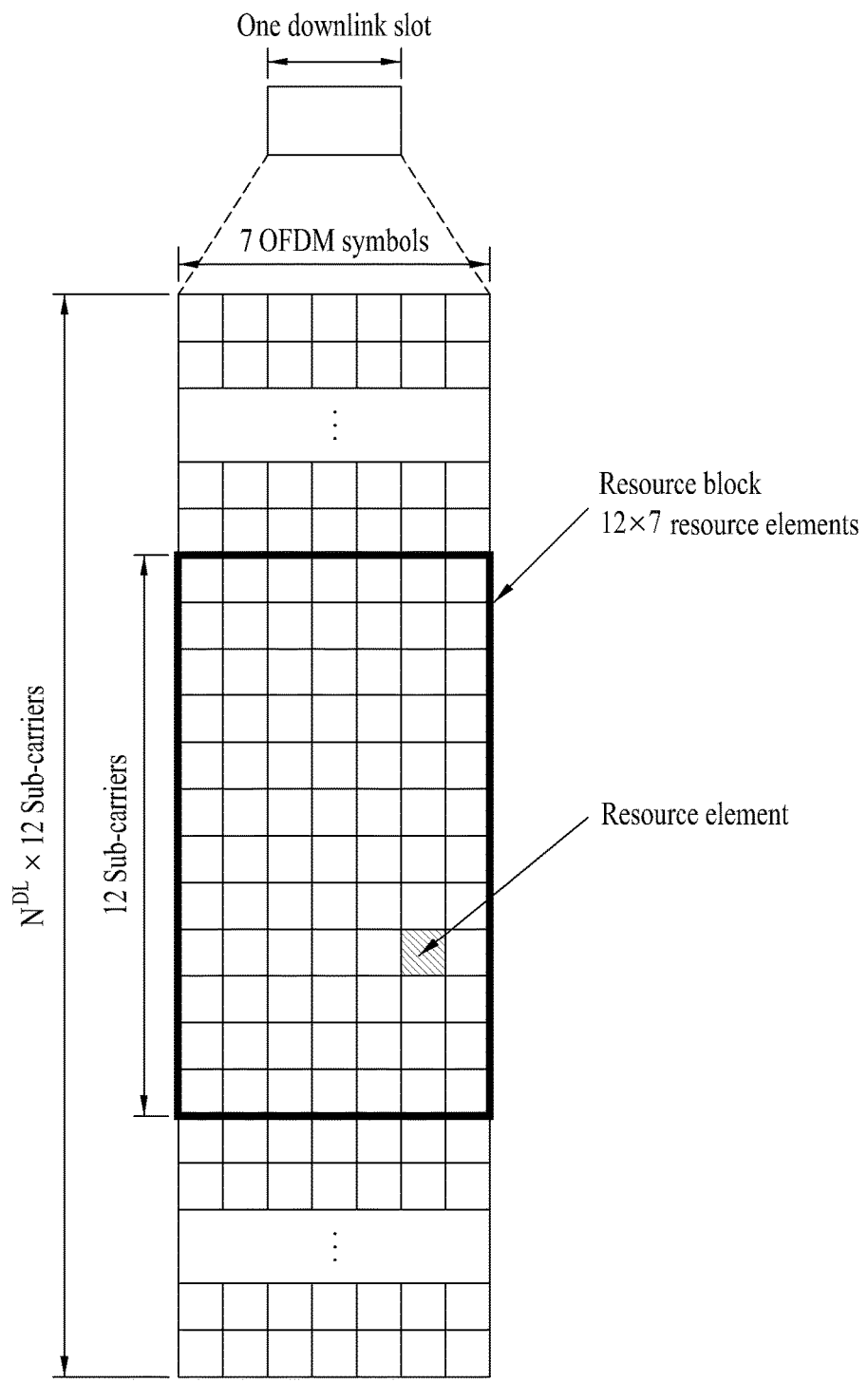
FIG. 2 exemplarily shows a resource grid of one downlink slot.

FIG. 2 is a diagram for a resource grid in a downlink slot. Referring to FIG. 2, one downlink (DL) slot includes 7 OFDM symbols and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Downlink Subframe Structure

Figure 3:
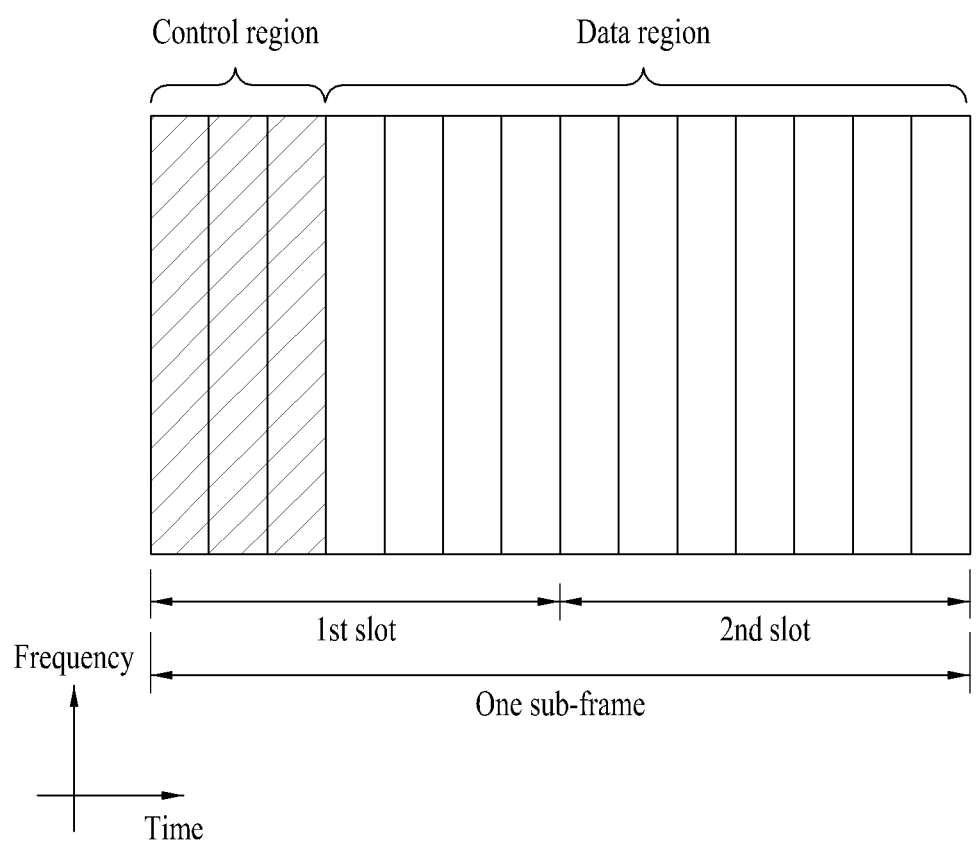
FIG. 3 exemplarily shows a downlink subframe structure.

FIG. 3 is a diagram for a structure of a downlink (DL) subframe. Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH is a response channel in response to UL transmission and includes an ACK/NACK signal. Control information carried on PDCCH may be called downlink control information (hereinafter abbreviated DCI). The DCI may include UL scheduling information, DL scheduling information or a UL transmit (Tx) power control command for a random UE (user equipment) group.

PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI)). In order to indicate a random access response that is a response to a transmission of a random access preamble of a user equipment, CRC can be masked with RA-RNTI (random access-RNTI).

PDCCH Processing

When PDCCHs are mapped to REs, control channel elements (CCEs) corresponding to contiguous logical allocation units are used. A CCE includes a plurality of (e.g. 9) REGs and an REG includes 4 neighboring REs except for a reference signal (RS).

The number of CCEs necessary for a specific PDCCH depends on a DCI payload corresponding to control information size, cell bandwidth, channel coding rate, etc. Specifically, the number of CCEs for a specific PDCCH can be determined based on PDCCH format shown in Table 1.

TABLE 1

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

While one of the above-mentioned four PDCCH formats may be used, this is not signaled to a UE. Accordingly, the UE performs decoding without knowing the PDCCH format, which is referred to as blind decoding. Since operation overhead is generated if a UE decodes all CCEs that can be used for downlink for each PDCCH, a search space is defined in consideration of limitation for a scheduler and the number of decoding attempts.

The search space is a set of candidate PDCCHs composed of CCEs on which a UE needs to attempt to perform decoding at an aggregation level. The aggregation level and the number of candidate PDCCHs can be defined as shown in Table 2.

TABLE 2

| | Search space | | The number of PDCCH candidates |
|---|---|---|---|
| | Aggregation level | Size (CCE unit) | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown in Table 2, the UE has a plurality of search spaces at each aggregation level because 4 aggregation levels are present. The search spaces may be divided into a UE-specific search space (USS) and a common search space (CSS), as shown in Table 2. The UE-specific search space is for a specific UE. Each UE may check an RNTI and CRC which mask a PDCCH by monitoring a UE-specific search space thereof (attempting to decode a PDCCH candidate set according to an available DCI format) and acquire control information when the RNTI and CRC are valid.

The common search space is used for a case in which a plurality of UEs or all UEs need to receive PDCCHs, for system information dynamic scheduling or paging messages, for example. The common search space may be used for a specific UE for resource management. Furthermore, the common search space may overlap with the UE-specific search space.

The UE attempts to decode a search space, as described above. The number of decoding attempts is determined by DCI format and transmission mode determined through RRC signaling. When carrier aggregation (CA) is not applied, the UE needs to perform a maximum of 12 decoding attempts because 2 DCI sizes (DCI format 0/1A/3/3A and DCI format 1C) have to be considered for each of 6 PDCCH candidates for a common search space. For a UE-specific search space, 2 DCI sizes are considered for (6+6+2+2=16) PDCCH candidates and thus a maximum of 32 decoding attempts is needed. Accordingly, a maximum of 44 decoding attempts needs to be performed when carrier aggregation (CA) is not applied.

Enhanced Control Channel (E-PDCCH)

Enhanced-PDCCH (E-PDCCH) will hereinafter be described as a representative example of an enhanced control channel.

While control information included in the above-described DCI formats is transmitted through a PDCCH defined in LTE/LTE-A in the above description, the control information can also be transmitted through a downlink control channel other than the PDCCH, for example, an enhanced PDCCH (E-PDCCH). The E-PDCCH is an extended form of a control channel carrying DCI for a UE and may be used to effectively support inter-cell interference control (ICIC), CoMP, MU-MIMO, etc.

The E-PDCCH is discriminated from the PDCCH in that the e-PDCCH and R-PDCCH are allocated to time-frequency resource regions (e.g., a data region of FIG. 3) other than regions (e.g., a control region of FIG. 3) defined for PDCCH transmission in LTE-LTE-A. In order to discriminate between a conventional PDCCH and E-PDCCH, the conventional PDCCH is referred to as a legacy PDCCH. For example, resource element (RE) mapping of E-PDCCH may indicate that REs of E-PDCCH are mapped to the remaining OFDM symbols other than initial N OFDM symbols (e.g., N≤4) of a downlink subframe in a time domain, and are also mapped to a set of semi-statically allocated resource blocks (RBs) in a frequency domain.

Similar to the reason of E-PDCCH introduction, E-PHICH may be defined as a new control channel carrying HARQ ACK/NACK information regarding uplink (UL) transmission, and E-PCFICH may be defined as a new control channel carrying information of a resource region used for transmission of a DL control channel. E-PDCCH, E-PHICH and/or E-PCFICH may be commonly referred to as enhanced—control channel(s).

Enhanced REG (EREG) may be used to define the Enhanced-control channel(s)-to-RE(s) mapping operation. For example, 16 EREGs (i.e., EREG 0 to EREG 15) may be present in one PRB pair. The remaining REs other than REs that are mapped to demodulation reference signal (DMRS) on a single PRB are numbered from 0 to 15. The numbering order may first be based on the frequency increasing order, and then based on the time increasing order. For example, REs indexed with 'i' may construct one EREG i.

Enhanced control channel (e.g., E-PDCCH) may be transmitted using an aggregation of one or more enhanced CCEs (ECCEs). Each ECCE may include one or more EREGs. The number of EREGs per ECCE may be, for example, 4 or 7. In case of a normal subframe of a normal CP, the number of EREGs per ECCE may be set to 4.

ECCEs available in E-PDCCH may be numbered from 0 to $N_{ECCE}-1$. For example, $N_{ECCE}$ may be set to 1, 2, 4, 8, 16 or 32.

The number of REs of a PRB pair configured to transmit the E-PDCCH may be defined as the number of REs satisfying the following conditions i), ii) and iii). The first condition (i) is that REs should be a part of one of 16 EREGs of a PRB pair. The second condition (ii) is that REs need not be used for Cell-specific Reference Signal (CRS) or Channel State Information-Reference Signal (CSI-RS). The third condition (iii) is that REs need to belong to OFDM symbols having an index higher than that of a start OFDM symbol at which E-PDCCH starts.

In addition, E-PDCCH may be mapped to REs in different ways according to the localized scheme and the distributed scheme. E-PDCCH may be mapped to REs configured to satisfy the following conditions a) to d). The first condition (a) means that REs should be a part of EREG allocated for transmission. The second condition (b) means that REs should not be a part of a PRB pair used to transmit a PBCH (Physical Broadcast Channel) or synchronization signal. The third condition (c) means that REs need not be used for CRS or CSI-RS of a specific UE. The fourth condition (d) means that REs should belong to OFDM symbols having an index higher than that of a start OFDM symbol at which E-PDCCH starts.

E-PDCCH allocation may be carried out as follows. One or more E-PDCCH-PRB sets may be established for a UE through higher layer signaling from a BS or eNB. For example, the E-PDCCH-PRB set for use in the case of E-PDCCH may be used to monitor the E-PDCCH.

In addition, cross interleaving may or may not be applied to RE mapping of the E-PDCCH.

If cross interleaving is not applied, one E-PDCCCH may be mapped to a specific set of RBs, and the number of RBs constructing the RB set may correspond to an aggregation level 1, 2, 4 or 8. In addition, other E-PDCCH may not be transmitted through the corresponding RB set.

If cross interleaving is applied, plural E-PDCCHs are simultaneously multiplexed and interleaved, the E-PDCCHs may be mapped to RBs allocated for transmission of the E-PDCCH. That is, the above-mentioned E-PDCCH-to-RB mapping may also indicate that plural E-PDCCHs are simultaneously mapped to a specific RB set.

DCI Format 1A

DCI format 1A may refer to a DCI format used for compact scheduling of one PDSCH codeword within one cell. In other words, DCI format 1A may include a variety of control information used in single-antenna transmission, single-stream transmission, or Tx diversity transmission, etc. Table 3 and Table 4 show examples of DCI format 1A defined in 3GPP LTE/LTE-A.

TABLE 3

| | |
|---|---|
| Carrier Indicator | 0 or 3 bits |
| Flag for format 0/format 1A differentiation | 1 bit |
| Localized/Distributed VRB assignment Flag | 1 bit |
| Resource Block Assignment | N bits |
| Modulation and coding scheme | 5 bits |
| HARQ process number | 3 bits (FDD), 4 bits (TDD) |

TABLE 3-continued

| | |
|---|---|
| New Data Indicator | 1 bit |
| Redundancy Version | 2 bits |
| TPC (Transmit Power Control) command for PUCCH | 2 bits |
| Downlink Assignment Index | 0 bit (FDD), 2 bits (TDD) |
| SRS (Sounding Reference Signal) request | 0 or 1 bit |

DCI format 1A including control information of Table 1 may be transferred from a BS (or eNB) to a UE through PDCCH or E-PDCCH.

DCI format 1A includes information that is capable of scheduling the most basic downlink transmission (i.e., one PDSCH codeword transmission at Rank 1). Accordingly, if a complicated PDSCH transmission scheme, such as transmission of at least Rank-2 and/or transmission of multiple codewords, is incorrectly performed, DCI format 1A may be used to support the most basic PDSCH transmission scheme (i.e., a fallback usage).

Uplink (UL) Subframe Structure

Figure 4:
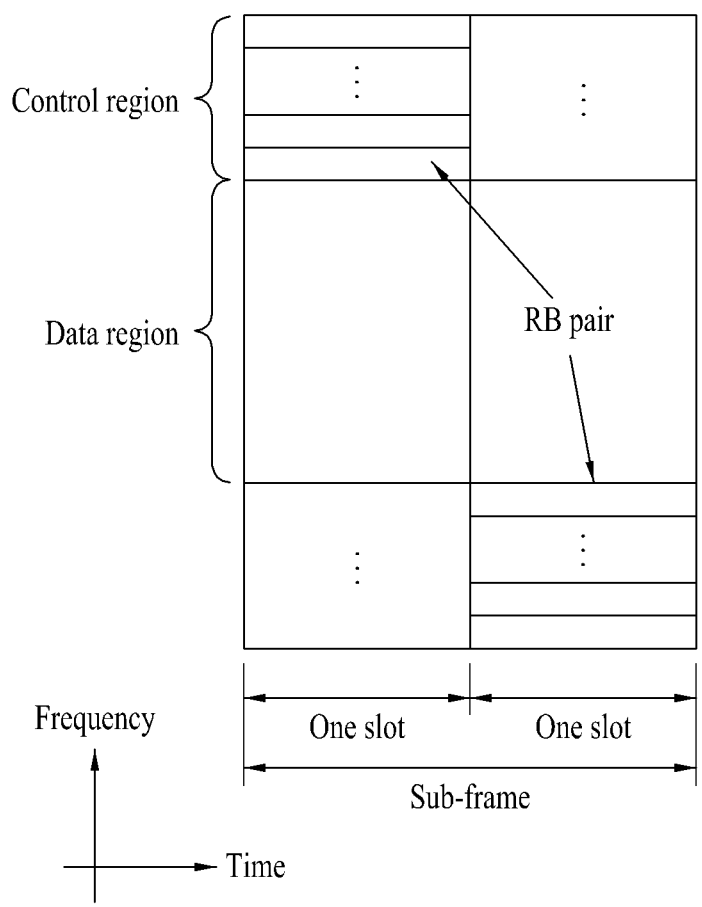
FIG. 4 exemplarily shows an uplink subframe structure.

FIG. 4 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS. In more detail, an independent RS should be transmitted through each Tx antenna port.

A downlink RS includes a Common RS (CRS) shared among all UEs in a cell and a Dedicated RS (DRS) for only a specific-UE. It is possible to provide information for channel estimation and demodulation using such RSs.

The reception side (UE) estimates the channel state from the CRS and feeds back an indicator associated with channel quality, such as a Channel Quality Indicator (CQI), a Precoding Matrix Index (PMI) and/or a Rank Indicator (RI), to the transmission side (eNodeB). The CRS may be also called a cell-specific RS. Alternatively, an RS associated with the feedback of Channel State Information (CSI) such as CQI/PMI/RI may be separately defined as a CSI-RS.

The DRS may be transmitted through REs if data demodulation on a PDSCH is necessary. The UE may receive the presence/absence of the DRS from a higher layer and receive information indicating that the DRS is valid only when the PDSCH is mapped. The DRS may be also called a UE-specific RS or a Demodulation RS (DMRS).

Figure 5:
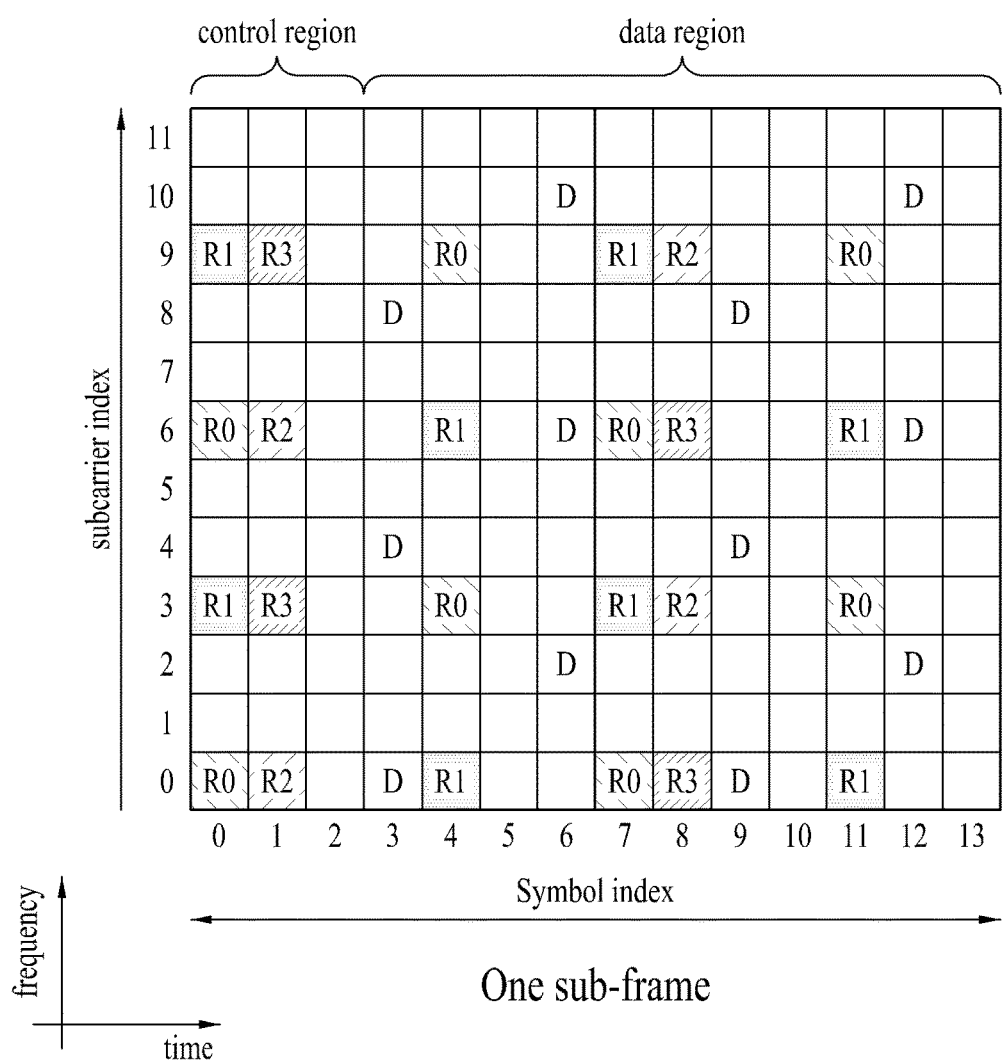
FIG. 5 is a conceptual diagram illustrating a downlink reference signal.

FIG. 5 is a diagram showing a pattern of CRSs and DRSs mapped on a downlink RB pair defined in the existing 3GPP LTE system (e.g., Release-8). The downlink RB pair as a mapping unit of the RSs may be expressed in units of one subframe on a time domain×12 subcarriers on a frequency domain. That is, on the time axis, one RB pair has a length of 14 OFDM symbols in case of the normal CP and has a length of 12 OFDM symbols in case of the extended CP. FIG. 5 shows a pair of RBs in case of a normal CP.

FIG. 5 shows the locations of the RSs on the RB pair in the system in which the eNodeB supports four transmission antennas. In FIG. 5, Resource Elements (REs) denoted by "R0", "R1", "R2" and "R3" indicate the locations of the CRSs of the antenna port indexes 0, 1, 2 and 3, respectively. In FIG. 5, the RE denoted by "D" indicates the location of the DRS.

Hereinafter, the CRS will be described in detail.

The CRS is used to estimate the channel of a physical antenna and is distributed over the entire band as an RS which is able to be commonly received by all UEs located within a cell. The CRS may be used for CSI acquisition and data demodulation.

The CRS is defined in various formats according to the antenna configuration of the transmission side (eNodeB). The 3GPP LTE (e.g., Release-8) system supports various antenna configurations, and a downlink signal transmission side (eNodeB) has three antenna configurations such as a single antenna, two transmission antennas and four transmission antennas. If the eNodeB performs single-antenna transmission, RSs for a single antenna port are arranged. If the eNodeB performs two-antenna transmission, RSs for two antenna ports are arranged using a Time Division Multiplexing (TDM) and/or Frequency Division Multiplexing (FDM) scheme. That is, the RSs for the two antenna ports are arranged in different time resources and/or different frequency resources so as to be distinguished from each other. In addition, if the eNodeB performs four-antenna transmission, RSs for four antenna ports are arranged using the TDM/FDM scheme. The channel information estimated by the downlink signal reception side (UE) through the CRSs may be used to demodulate data transmitted using a transmission scheme such as single antenna transmission, transmit diversity, closed-loop spatial multiplexing, open-loop spatial multiplexing, or Multi-User MIMO (MU-MIMO).

If multiple antennas are supported, when RSs are transmitted from a certain antenna port, the RSs are transmitted at the locations of the REs specified according to the RS pattern and any signal is not transmitted at the locations of the REs specified for another antenna port.

The rule of mapping the CRSs to the RBs is defined by Equation 1.

$$k = 6m + (v + v_{shift}) \bmod 6 \qquad \text{[Equation 1]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k denotes a subcarrier index, l denotes a symbol index, and p denotes an antenna port index. $N_{symb}^{DL}$ denotes the number of OFDM symbols of one downlink slot, $N_{ID}^{cell}$ denotes the number of RBs allocated to the downlink, $n_s$ denotes a slot index, and $N_{ID}^{cell}$ denotes a cell ID. mod indicates a modulo operation. The location of the RS in the frequency domain depends on a value $V_{shift}$. Since the value $V_{shift}$ depends on the cell ID, the location of the RS has a frequency shift value which varies according to the cell.

More specifically, in order to increase channel estimation performance through the CRSs, the locations of the CRSs in the frequency domain may be shifted so as to be changed according to the cells. For example, if the RSs are located at an interval of three subcarriers, the RSs are arranged on 3k-th subcarriers in one cell and arranged on (3k+1)-th subcarriers in the other cell. In view of one antenna port, the RSs are arranged at an interval of 6 REs (that is, interval of 6 subcarriers) in the frequency domain and are separated from REs, on which RSs allocated to another antenna port are arranged, by 3 REs in the frequency domain.

In addition, power boosting is applied to the CRSs. The power boosting indicates that the RSs are transmitted using higher power by bringing (stealing) the powers of the REs except for the REs allocated for the RSs among the REs of one OFDM symbol.

In the time domain, the RSs are arranged from a symbol index (l=0) of each slot as a starting point at a constant interval. The time interval is differently defined according to the CP length. The RSs are located on symbol indexes 0 and 4 of the slot in case of the normal CP and are located on symbol indexes 0 and 3 of the slot in case of the extended CP. Only RSs for a maximum of two antenna ports are defined in one OFDM symbol. Accordingly, upon four-transmission antenna transmission, the RSs for the antenna ports 0 and 1 are located on the symbol indexes 0 and 4 (the symbol indexes 0 and 3 in case of the extended CP) of the slot and the RSs for the antenna ports 2 and 3 are located on the symbol index 1 of the slot. The frequency locations of the RSs for the antenna ports 2 and 3 in the frequency domain are exchanged with each other in a second slot.

Hereinafter, the DRS will be described in detail.

The DRS (or the UE-specific RS) is used to demodulate data. A precoding weight used for a specific UE upon multi-antenna transmission is also used in an RS without change so as to estimate an equivalent channel, in which a transfer channel and the precoding weight transmitted from each transmission antenna are combined, when the UE receives the RSs.

The existing 3GPP LTE system (e.g., Release-8) supports four-transmission antenna transmission as a maximum and the DRS for Rank 1 beamforming is defined. The DRS for Rank 1 beamforming is also denoted by the RS for the antenna port index 5. The rule of the DRS mapped on the RBs is defined by Equation 2. Equation 2 is for the normal CP and Equation 2 is for the extended CP.

$$k = (k') \bmod N_{sc}^{RB} + N_{sc}^{RB} \cdot n_{PRB} \quad \text{[Equation 2]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

In Equation 2, k denotes a subcarrier index, l denotes a symbol index, and p denotes an antenna port index. $N_{SC}^{RB}$ denotes the resource block size in the frequency domain and is expressed by the number of subcarriers. $n_{PRB}$ denotes a physical resource block number. $N_{RB}^{PDSCH}$ denotes the bandwidth of the RB of the PDSCH transmission. $n_s$ denotes a slot index, and $N_{ID}^{cell}$ denotes a cell ID. mod indicates a modulo operation. The location of the RS in the frequency domain depends on a value $V_{shift}$. Since the value $V_{shift}$ depends on the cell ID, the location of the RS has a frequency shift value which varies according to the cell.

In LTE-A corresponding to an evolved version of 3GPP LTE, high-order MIMO, multi-cell transmission, evolved MU-MIMO, etc. have been considered. To support efficient RS management and the evolved Tx scheme, DM RS-based data modulation has been considered in LTE-A. That is, unlike DMRS (Antenna Port Index #5) for Rank #1 beamforming defined in legacy 3GPP LTE (e.g., Release-8), DMRS for two or more layers may be defined to support data transmission through additional antennas.

Figure 6:
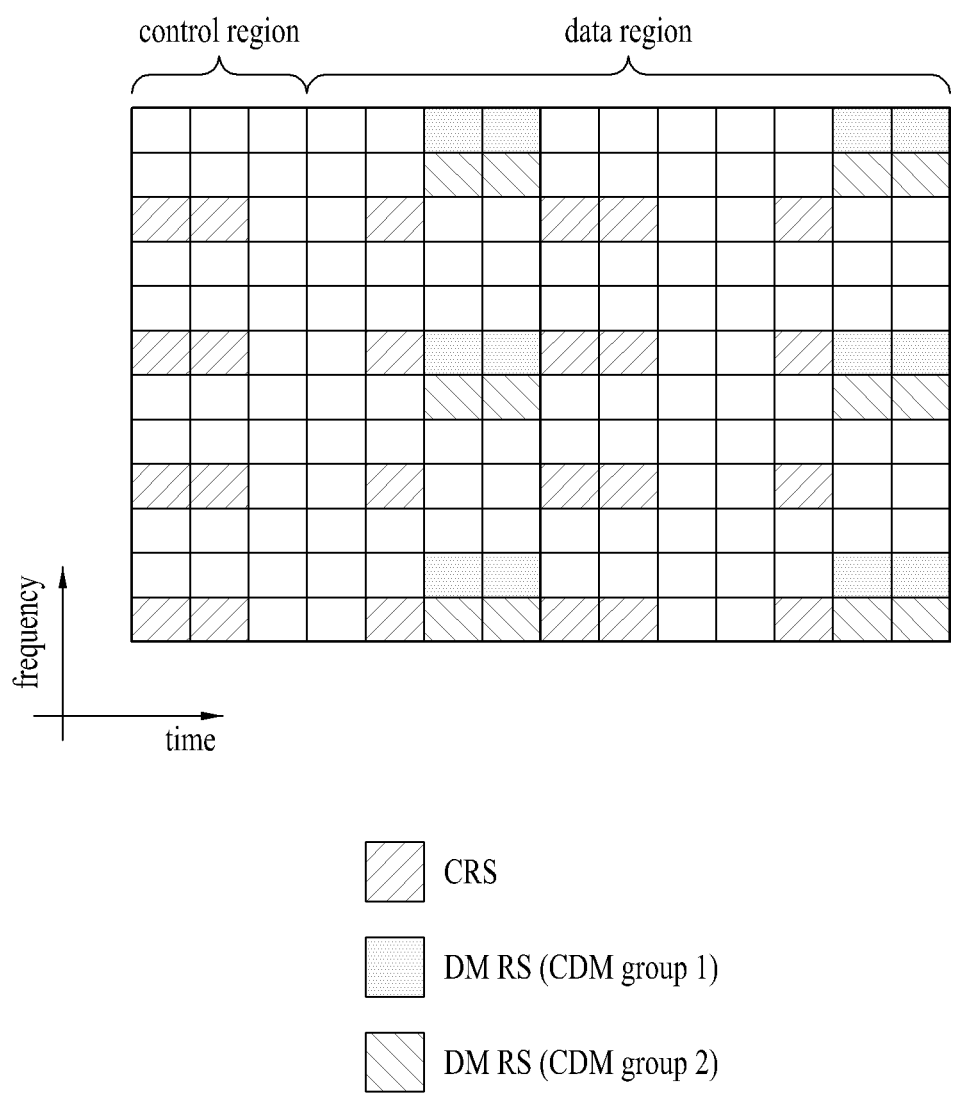
FIG. 6 is a conceptual diagram illustrating DMRS patterns defined in LTE-A.

FIG. 6 is a diagram showing exemplary DMRS patterns defined in LTE-A.

In FIG. 6, in case of one RB pair (in case of a normal CP, 14 OFDM symbols in a time domain×12 subcarriers in a frequency domain) used for DL data transmission, FIG. 6 shows the locations of resource elements (REs) used for DMRS transmission. DMRS may be transmitted to 8 antenna ports (Antenna Port Indexes #7 to #14) additionally defined in the LTE-A system. DMRSs for different antenna ports are located at different frequency resources (subcarriers) and/or different time resources (OFDM symbols), such that each DMRS can be identified. That is, DMRSs may be multiplexed according to the FDM and/or TDM scheme(s). In addition, DMRSs of different antenna ports located at the same time-frequency resources may be distinguished from each other by different orthogonal codes (that is, the DMRSs may be multiplexed according to the CDM scheme).

Meanwhile, in an LTE-A (Advanced) system which is an evolved version of the wireless communication system, separate CSI-RSs for measuring channel status information (CSI) for new antenna ports are defined.

Figure 7:
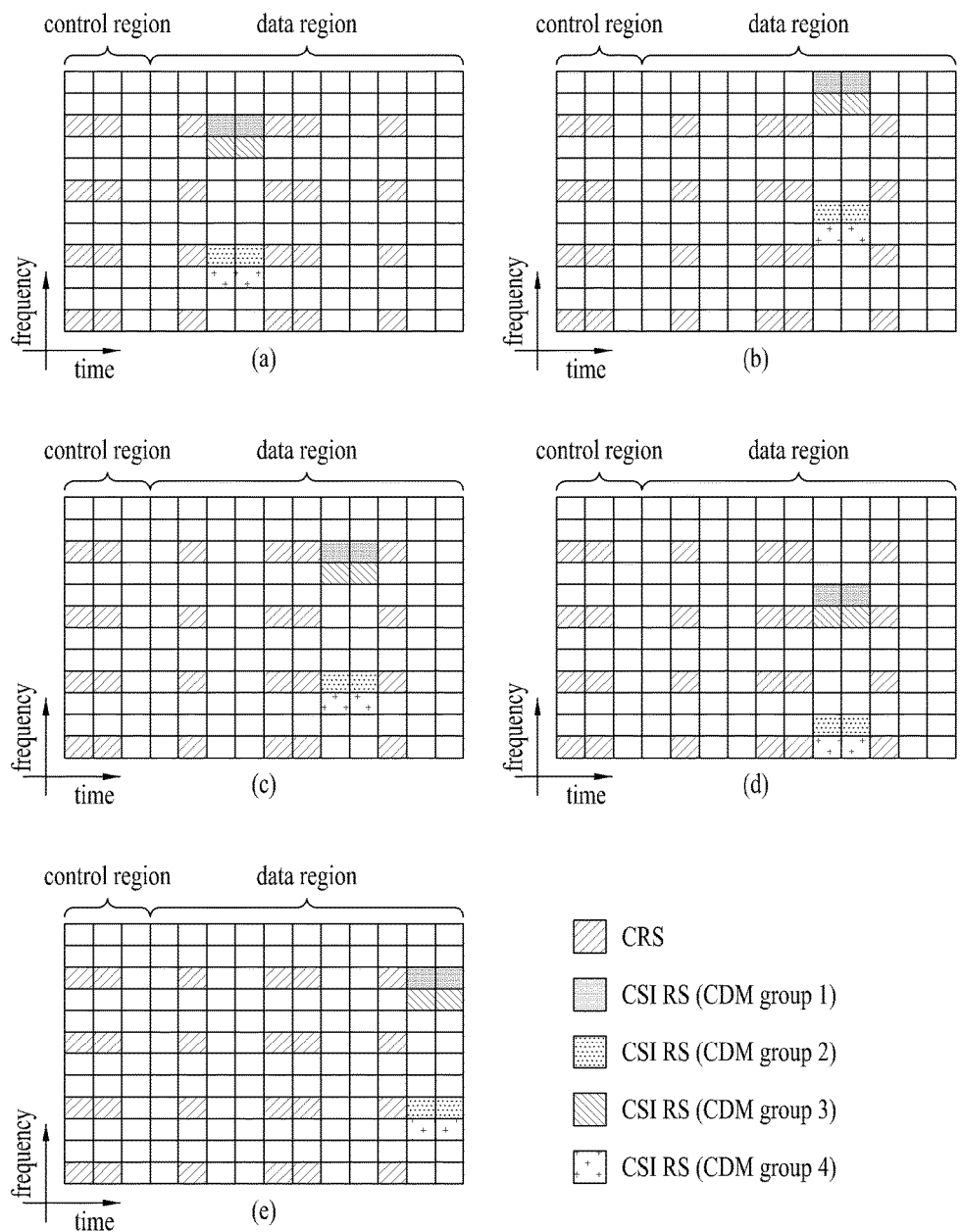
FIG. 7 is a conceptual diagram illustrating CSI-RS patterns defined in LTE-A.

FIG. 7 is a diagram showing exemplary CSI-RS patterns defined in LTE-A. In more detail, in case of one RB pair (in case of a normal CP, 14 OFDM symbols in a time domain× 12 subcarriers in a frequency domain) used for DL data transmission, FIG. 7 shows the locations of resource elements (REs) used for CSI-RS transmission. One CSI-RS pattern shown in FIGS. 7(a) to 7(e) may be used in a certain DL subframe. CSI-RS may be transmitted to 8 antenna ports (Antenna Port Indexes #15 to #22) additionally defined in the LTE-A system. CSI-RSs for different antenna ports are located at different frequency resources (subcarriers) and/or different time resources (OFDM symbols), such that each CSI-RS can be identified. That is, CSI-RSs may be multiplexed according to the FDM and/or TDM scheme(s). In addition, CSI-RSs of different antenna ports located at the same time-frequency resources may be distinguished from each other by different orthogonal codes (that is, the CSI-RSs may be multiplexed according to the CDM scheme). As can be seen from FIG. 7(a), CSI-RSs of Antenna Ports #15 and #16 may be located at REs denoted by CSI-RS CDM Group #1, and may be multiplexed by orthogonal codes. CSI-RSs of Antenna Ports #17 and #18 may be located at REs denoted by CSI-RS CDM Group #2 as shown in FIG. 7(a), and may be multiplexed by orthogonal codes. In FIG. 7(a), CSI-RSs of Antenna Ports #19 and #20 may be located at REs denoted by CSI-RS CDM Group #3, and may be multiplexed by orthogonal codes. CSI-RSs of Antenna Ports #21 and #22 may be located at REs denoted by CSI-RS CDM Group #4 as shown in FIG. 7(a), and may be multiplexed by orthogonal codes. The same principles described in FIG. 7(a) may be applied to FIGS. 7(b) to 7(e).

RS patterns shown in FIGS. 5 to 7 are disclosed only for illustrative purposes, and the scope or spirit of the present invention are not limited only to these RS patterns. That is, even in the case in which RS patterns different from those of FIGS. 5 to 7 are defined and used, various embodiments of the present invention can also be equally applied thereto without difficulty.

Carrier Aggregation

Figure 8:
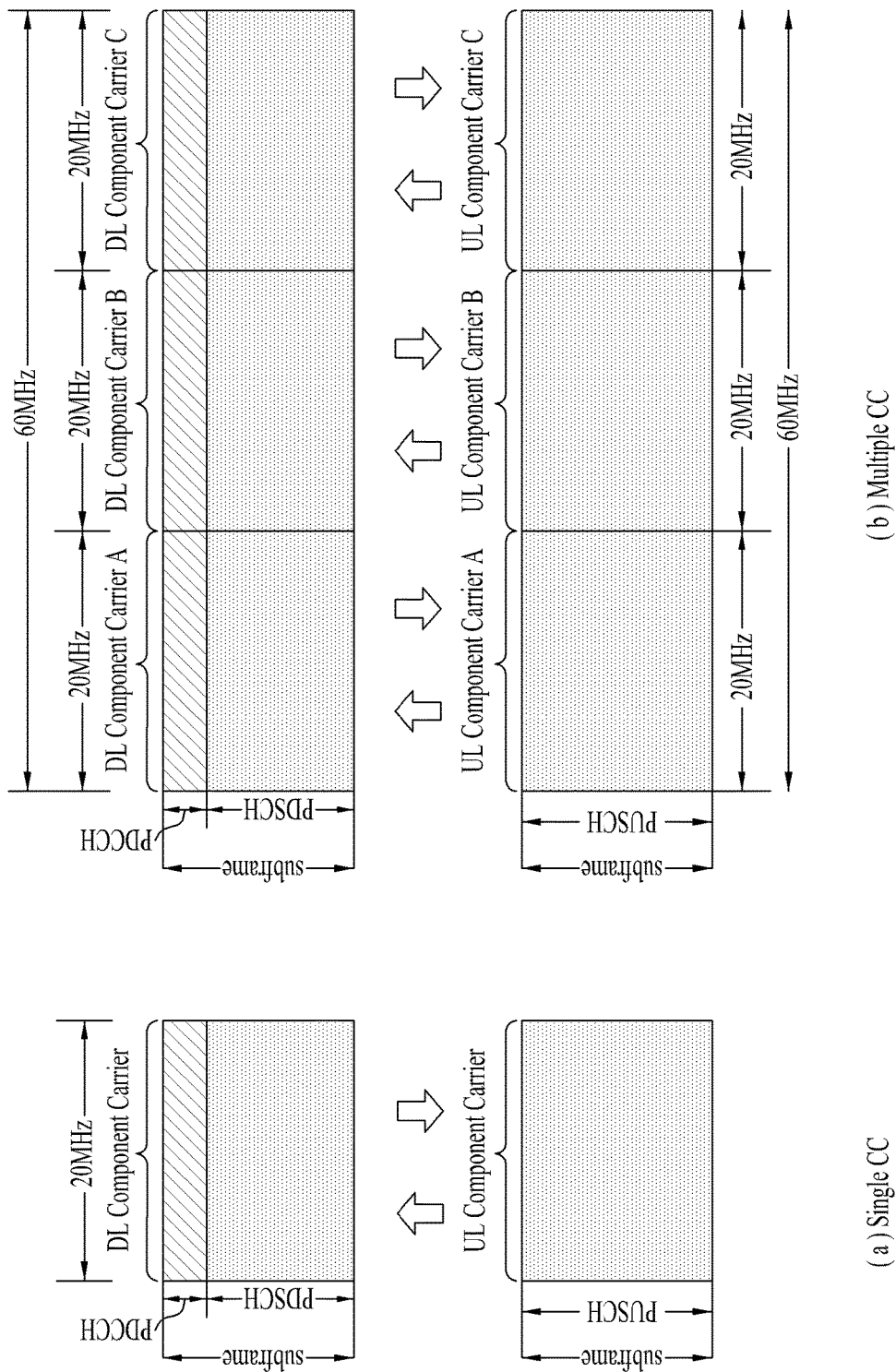
FIG. 8 is a conceptual diagram illustrating carrier aggregation (CA).

FIG. 8 is a diagram illustrating carrier aggregation (CA). The concept of a cell, which is introduced to manage radio resources in LTE-A is described prior to the CA. A cell may be regarded as a combination of downlink resources and uplink resources. The uplink resources are not essential elements, and thus the cell may be composed of the downlink resources only or both the downlink resources and uplink resources. This is defined in LTE-A release 10, and the cell may be composed of the uplink resources only. The downlink resources may be referred to as downlink component carriers and the uplink resources may be referred to as uplink component carriers. A downlink component carrier (DL CC) and a uplink component carrier (UL CC) may be represented by carrier frequencies. A carrier frequency means a center frequency in a cell.

Cells may be divided into a primary cell (PCell) operating at a primary frequency and a secondary cell (SCell) operating at a secondary frequency. The PCell and SCell may be collectively referred to as serving cells. The PCell may be designated during an initial connection establishment, connection re-establishment or handover procedure of a UE. That is, the PCell may be regarded as a main cell relating to control in a CA environment. A UE may be allocated a PUCCH and transmit the PUCCH in the PCell thereof. The SCell may be configured after radio resource control (RRC) connection establishment and used to provide additional radio resources. Serving cells other than the PCell in a CA environment may be regarded as SCells. For a UE in an RRC_connected state for which CA is not established or a UE that does not support CA, only one serving cell composed of the PCell is present. For a UE in the RRC-connected state for which CA is established, one or more serving cells are present and the serving cells include a PCell and SCells. For a UE that supports CA, a network may configure one or more SCells in addition to a PCell initially configured during connection establishment after initial security activation is initiated.

CA is described with reference to FIG. 8. CA is a technology introduced to use a wider band to meet demands for a high transmission rate. CA can be defined as aggregation of two or more component carriers (CCs) having different carrier frequencies. FIG. 8(a) shows a subframe when a conventional LTE system uses a single CC and FIG. 8(b) shows a subframe when CA is used. In FIG. 8(b), 3 CCs each having 20 MHz are used to support a bandwidth of 60 MHz. The CCs may be contiguous or non-contiguous.

A UE may simultaneously receive and monitor downlink data through a plurality of DL CCs. Linkage between a DL CC and a UL CC may be indicated by system information. DL CC/UL CC linkage may be fixed to a system or semi-statically configured. Even when a system bandwidth is configured of N CCs, a frequency bandwidth that can be monitored/received by a specific UE may be limited to M (<N) CCs. Various parameters for CA may be configured cell-specifically, UE group-specifically, or UE-specifically.

Figure 9:
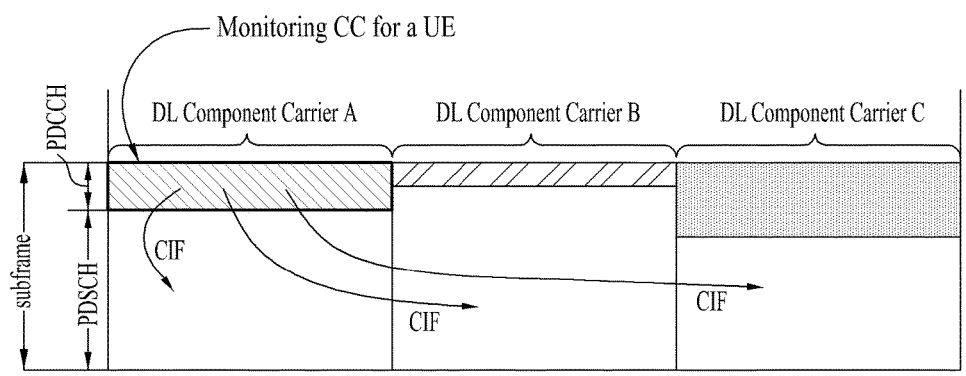
FIG. 9 is a conceptual diagram illustrating cross carrier scheduling.

FIG. 9 is a diagram illustrating cross-carrier scheduling. Cross carrier scheduling is a scheme by which a control region of one of DL CCs of a plurality of serving cells includes downlink scheduling allocation information the other DL CCs or a scheme by which a control region of one of DL CCs of a plurality of serving cells includes uplink scheduling grant information about a plurality of UL CCs linked with the DL CC.

A carrier indicator field (CIF) is described first.

The CIF may be included in a DCI format transmitted through a PDCCH (for example, CIF may be 3 bits long), or may not be included in the DCI format transmitted through PDCCH (for example, CIF may be 0 bit long). When the CIF is included in the DCI format, this represents that cross carrier scheduling is applied. When cross carrier scheduling is not applied, downlink scheduling allocation information is valid on a DL CC currently carrying the downlink scheduling allocation information. Uplink scheduling grant is valid on a UL CC linked with a DL CC carrying downlink scheduling allocation information.

When cross carrier scheduling is applied, the CIF indicates a CC associated with downlink scheduling allocation information transmitted on a DL CC through a PDCCH. For example, referring to FIG. 9, downlink allocation information for DL CC B and DL CC C, that is, information about PDSCH resources is transmitted through a PDCCH in a control region of DL CC A. A UE can recognize PDSCH resource regions and the corresponding CCs through the CIF by monitoring DL CC A.

Whether or not the CIF is included in a PDCCH may be semi-statically set and UE-specifically enabled according to higher layer signaling.

When the CIF is disabled, a PDCCH on a specific DL CC may allocate a PDSCH resource on the same DL CC and assign a PUSCH resource on a UL CC linked with the specific DL CC. In this case, the same coding scheme, CCE based resource mapping and DCI formats as those used for the conventional PDCCH structure are applicable.

When the CIF is enabled, a PDCCH on a specific DL CC may allocate a PDSCH/PUSCH resource on a DL/UL CC indicated by the CIF from among aggregated CCs. In this case, the CIF can be additionally defined in existing PDCCH DCI formats. The CIF may be defined as a field having a fixed length of 3 bits, or a CIF position may be fixed irrespective of DCI format size. In this case, the same coding scheme, CCE based resource mapping and DCI formats as those used for the conventional PDCCH structure are applicable.

Even when the CIF is present, an eNB can allocate a DL CC set through which a PDCCH is monitored. Accordingly, blinding decoding overhead of a UE can be reduced. A PDCCH monitoring CC set is part of aggregated DL CCs and a UE can perform PDCCH detection/decoding in the CC set only. That is, the eNB can transmit the PDCCH only on the PDCCH monitoring CC set in order to schedule a PDSCH/PUSCH for the UE. The PDCCH monitoring DL CC set may be configured UE-specifically, UE group-specifically or cell-specifically. For example, when 3 DL CCs are aggregated as shown in FIG. 9, DL CC A can be configured as a PDCCH monitoring DL CC. When the CIF is disabled, a PDCCH on each DL CC can schedule only the PDSCH on DL CC A. When the CIF is enabled, the PDCCH on DL CC A can schedule PDSCHs in other DL CCs as well as the PDSCH in DL CC A. When DL CC A is set as a PDCCH monitoring CC, DL CC B and DL CC C do not transmit PDSCHs.

Coordinated Multi-Point: CoMP

CoMP transmission/reception scheme (which is also referred to as co-MIMO, collaborative MIMO or network MIMO) is proposed to meet enhanced system performance requirements of 3GPP LTE-A. CoMP can improve the performance of a UE located at a cell edge and increase average sector throughput.

In a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

CoMP applicable to downlink can be classified into joint processing (JP) and coordinated scheduling/beamforming (CS/CB).

According to the JP, each point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection (DCS) refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

Method for Receiving Physical Channel in Multi-Cell Environment

A wireless communication system to which the aforementioned CoMP and/or carrier aggregation (CA) operations are applied is referred to as a multi-cell system or a multi-cell environment. In order for the UE to correctly receive and demodulate a physical channel, correction assumption of various attributes (e.g., resource allocation, associated reference signal (RS), Tx time point, Tx power, scrambling information, etc.) applied to the physical channel is needed. Specifically, since plural cells collaboratively transmit a physical channel in a multi-cell environment, physical-channel assumption applied to the UE receiving the physical channel cannot be used in the legacy single-cell environment.

The present invention proposes a method for enabling a UE to correctly receive a physical channel in a multi-cell environment. In more detail, the present invention proposes detailed methods/rules decided or assumed by the UE in association with attributes of a physical channel transmitted in a multi-cell environment.

Embodiment 1

Embodiment 1 relates to a method for enabling a network to signal information associated with resource mapping positions of a physical channel transmitted in a multi-cell environment.

For example, in response to the resource-mapping-location associated information of a physical channel transmitted in the multi-cell environment, the UE may decide not only assumption of reference signal (e.g., CRS) location needed for reception or demodulation of the physical channel, but also the RE mapping scheme.

Figure 10:
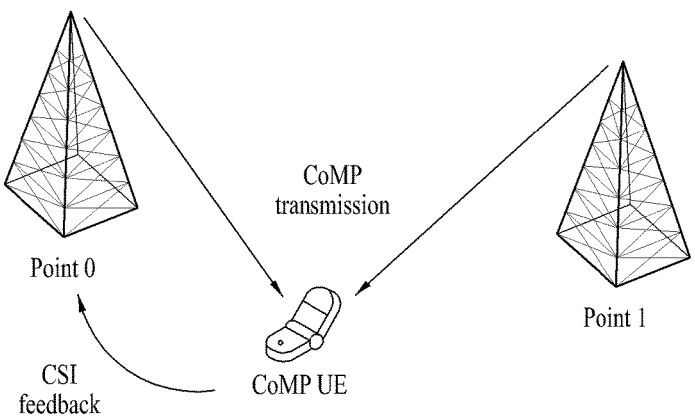
FIG. 10 is a conceptual diagram illustrating a method for allowing a UE to receive a downlink signal from two transmit points (TPs) in a multi-cell environment.

FIG. 10 is a conceptual diagram illustrating a method for allowing a UE to receive a downlink signal from two transmit points (TPs) in a multi-cell environment.

Referring to FIG. 10, Tx points #0 and #1 may transmit a downlink signal to a CoMP UE through the CoMP operation, and the CoMP UE may report CSI feedback regarding a downlink channel to the Tx point #0.

The example of FIG. 10 can also be explained from the viewpoint of carrier aggregation (CA) technology. For example, Tx points #0 and #1 may correspond to PCell and SCell, respectively, and CA may be established for a UE configured to perform the CoMP operation throughout the plurality of cells (i.e., PCell and SCell). In this case, PDCCH of the UE may be received from a cell indicated by PCell, and PDSCH of the UE may be transmitted by collaboration of PCell and SCell (e.g., joint transmission JT or dynamic cell selection DCS).

In addition, Tx points #0 and #1 of FIG. 10 may be denoted by a serving cell and a neighboring cell of the UE, respectively. In more detail, a specific cell in which PDCCH for the UE is transmitted and the basic measurement (e.g., RRM (Radio Resource Management)/RLM (Radio Link Monitoring) measurement) of the UE and various reports are achieved may be represented by a serving cell.

In this case, scheduling information of a PDSCH transmitted by collaboration of the serving cell and the neighbor cell may be acquired from a PDCCH transmitted on the serving cell. That is, the serving cell may be represented by a Tx point at which scheduling information of the UE is transmitted.

In the following description, Tx point #0, PCell and Serving Cell will hereinafter be referred to as one term "PCell", and Tx point #1, SCell and Neighbor Cell will hereinafter be referred to as one term "SCell".

Since SCell does not independently perform PDSCH scheduling, it can be appreciated that PDCCH on PCell performs PDSCH scheduling caused by SCell participation using the cross-carrier scheduling scheme. However, during the CoMP operation, individual cells (PCell and SCell(s)) are located on the same carrier frequency in a different way from the legacy carrier aggregation (CA), this means that plural cells participate in data transmission on the same one carrier frequency. In this case, a carrier indicator field (CIF) may be interpreted or used as specific information indicating a cell participating in PDSCH transmission, instead of indicating a carrier frequency used for PDSCH transmission. In addition, since only one PDSCH is transmitted on a single frequency carrier, the PDCCH search space of the CoMP UE is activated only one PCell, and the search space may not be activated on SCell. In this case, scheduling information of all PDSCH transmission, that includes PDSCH transmission on PCell, PDSCH transmission on SCell, and PDSCH transmission in which PCell and SCell simultaneously participate, may be transmitted through a PDCCH transmitted on a search space of PCell. That is, whereas the CoMP UE performs PDCCH (or E-PDCCH) blind decoding only in a search space of PCell, the CoMP UE may not perform PDCCH (or E-PDCCH) blind decoding only in a search space of SCell.

For example, in the case of dynamic cell selection (or dynamic point selection) from among the CoMP operation, the network may schedule a PDSCH using a PDCCH of PCell, and may indicate which cell is used for transmission of the corresponding PDSCH using a CIF. For example, assuming that transmission in a specific SCell is indicated by the CIF, the UE may assume that PDSCH is not mapped to a CRS position of the corresponding SCell and the PDSCH can be demodulated. In other words, if PDSCH is mapped to resource elements (REs) other than a specific RE position, this PDSCH mapping is referred to as rate matching. In case of the rate matching, the UE predicts a PDSCH rate matching pattern on a cell indicated by the CIF, and may demodulate a PDSCH transmitted in the corresponding cell on the basis of the predicted PDSCH rate matching pattern.

Since the legacy CIF indicates one cell, this CIF can be properly used during dynamic cell selection in which only one cell is associated with PDSCH transmission at a specific time. However, in case of joint transmission (JT) in which two or more cells simultaneously transmit a PDSCH, it is impossible to represent which cells participate in PDSCH transmission through only a reuse of the legacy CIF. That is, in case of using the legacy CIF without change, it is impossible to inform a UE of which cells are associated with a PDSCH transmitted according to the CoMP JT scheme. In addition, in order to demodulate a PDSCH transmitted from a plurality of cells, the UE must determine not only the CRS position (i.e., the position of a resource element not mapped to PDSCH) for each cell, but also the PDSCH rate matching pattern. In this case, it is impossible for the UE to recognize which cell is used for PDSCH transmission, such that it is impossible to correctly decide the CRS position of a certain cell to be considered.

Accordingly, the present invention proposes a method for enabling some states of the CIF to indicate the fact that plural cells participate in PDSCH transmission. For example, it is assumed that CIF is 3 bits long and carrier aggregation (CA) supports cross-carrier scheduling regarding a maximum of 5 carriers. In this case, in order to indicate a target cell to which cross-carrier scheduling is applied, a maximum of 5 states (e.g., 000, 001, 010, 011, 100) is needed, and the remaining 3 states (e.g., 101, 110, 111) may indicate the fact that plural cells proposed by the present invention participate in PDSCH transmission. For example, if the CIF status is denoted by '101', this means that PCell and $1^{st}$ SCell participate in JT of PDSCH. If the CIF status is denoted by '110', this means that PCell and $2^{nd}$ SCell participate in JT of PDSCH. If the CIF status is denoted by '111', $1^{st}$ SCell and $2^{nd}$ SCell participate in JT of PDSCH. The above-mentioned CIF may be referred to as a modified CIF. The relationship of mapping between the modified CIF status and the content indicating some cells participating in transmission may be determined in advance, or may be established by the network through higher layer signaling (e.g., RRC signaling) so as to support more flexible operations.

A UE having received the modified CIF proposed by the present invention may demodulate the corresponding PDSCH on the assumption that PDSCH is not mapped to RE(s) through which each cell indicated by the modified CIF transmits the CRS. That is, the UE may determine the PDSCH rate matching pattern of each cell participating in PDSCH transmission on the basis of the modified CIF. As a result, the modified CIF proposed by the present invention may be interpreted as specific information for indicating the CRS position to be assumed during PDSCH demodulation. If this interpretation is applied, the modified CIF may directly provide information of the CRS position at the corresponding subframe. For example, if the legacy CIF indicates only a specific cell, the modified CIF proposed by the present invention may directly indicate not only a value of $V_{shift}$ of a CRS of a specific cell (or the set of cells), but also the number of CRS ports. Alternatively, although the modified CIF may be constructed using some states of the legacy CIF, the modified CIF is composed of a separate indicator different from that of the legacy CIF, so that the modified CIF may indicate the CRS position.

Therefore, the modified CIF proposed by the present invention may be composed of information indicating which cell(s) participate(s) in PDSCH transmission, and/or may be composed of other information indicating a PDSCH rate-matching pattern of each participation cell. In addition, the modified CIF proposed by the present invention is not limited to the terms, and may also include the content proposed by the present invention.

Embodiment 2

Embodiment 2 relates to a method for deciding a scrambling sequence applied to a physical channel transmitted in a multi-cell environment.

During transmission of a physical channel, Tx bits may be scrambled by a UE-specific scrambling sequence prior to the modulation step for interference cancellation. A seed value of this scrambling sequence may be determined on the basis of a cell ID. The scrambling sequence of a PDSCH transmitted in a multi-cell environment is decided by an identifier (ID) of the cell configured to transmit a PDSCH. Accordingly, in order for the UE to correctly receive a PDSCH transmitted in the multi-cell environment, the UE must determine a scrambling sequence of the corresponding PDSCH. Since the modified CIF indicates a specific cell (or a set of cells) participating in PDSCH transmission, the UE has to determine which cell relates to a cell ID applied to the scrambling sequence applied to the corresponding PDSCH.

Accordingly, the present invention proposes the following methods showing the rule for deciding a seed value (e.g., a cell ID) applied to a PDSCH scrambling sequence, simultaneously with or independently from the modified CIF.

In a first method, the PDSCH scrambling sequence may always be decided on the basis of the cell ID of PCell.

In a second method, if plural cells participate in PDSCH transmission, this means that the PDSCH scrambling sequence is decided on the basis of the cell ID of PCell. If plural cells participate in PDSCH transmission, this means that the PDSCH scrambling sequence is decided on the basis of a cell ID of one cell.

In a third method, priority may be assigned to the cell ID applied to the PDSCH scrambling sequence. For example, a cell ID of the highest-priority cell from among cells actually participating in PDSCH transmission may be applied to PDSCH scrambling sequence. For example, priority of a cell associated with the PDSCH scrambling sequence may be preset to the order of PCell>$1^{st}$ SCell>$2^{nd}$ SCell> . . . .

Rules of one of the above methods may be shared between a network and a UE. Accordingly, the BS may generate a scrambling sequence according to one of the above rules, and apply the scrambling sequence to PDSCH transmission. The UE may decide a scrambling sequence according to the same rules as in rules used by the BS, such that the UE can correctly receive/demodulate the corresponding PDSCH.

Embodiment 3

Embodiment 3 relates to a method for deciding a sequence of a reference signal associated with demodulation of a physical channel transmitted in the multi-cell environment.

Reference signal (i.e., DMRS or UE-specific RS) associated with PDSCH demodulation may use the cell UE as a seed value so as to generate a predetermined pseudo random sequence, so that the pseudo random sequence may be used for the reference signal. If one cell transmits a PDSCH in the legacy wireless communication system, a seed value of DMRS sequence generation is definitely decided. If plural cells participate in PDSCH transmission, information as to whether a sequence of a DMRS related to the corresponding PDSCH should be generated on the basis of a cell ID of a certain cell is not decided.

Accordingly, simultaneously with or separately from the method for using the proposed modified CIF, the present invention proposes a method for enabling the network to inform the UE of a seed value (e.g., a cell ID, or other values used for sequence creation) applied to the DMRS sequence. If plural cells participate in PDSCH transmission through higher layer signaling (e.g., RRC signaling), the network may pre-inform each cell-set of the seed value used in generation of a DMRS sequence related to the corresponding PDSCH. For example, if cells participating in PDSCH transmission by the modified CIF proposed by the pres are indicated, a DMRS sequence generation seed value corresponding to the cell set composed of the corresponding cells is decided, it is assumed that a DMRS sequence is generated by the decided seed value, so that DMRS detection and PDSCH demodulation can be carried out on the above-mentioned assumption.

For example, if PCell, $1^{st}$ Scell, and $2^{nd}$ SCell are set to provisional cells participating in CoMP, the network may inform the UE of a virtual cell ID as a seed value of DMRS used per cell-set through higher layer signaling. For example, in case of using the set of PCell and $1^{st}$ SCell, this means that a virtual cell ID (a) is used to generate a DMRS sequence. In case of using the set of PCell and $2^{nd}$ SCell, this means that a virtual cell ID (b) is used to generate a DMRS sequence. In case of using the set of $1^{st}$ SCell and $2^{nd}$ SCell, a virtual cell ID (c) is used to generate a DMRS sequence. In case of using the set of PCell, $1^{st}$ SCell and $2^{nd}$ SCell, this means that a virtual cell ID (d) is used to generate a DMRS sequence. In this case, each virtual cell ID (a, b, c, or d) may be an arbitrary cell ID, may be a series of numbers having the same (or similar) format as the cell ID, and some virtual cell IDs may overlap with each other.

Embodiment 4

Embodiment 4 relates to a method for constructing and interpreting the modified CIF in consideration of an MBSFN (Multicast-Broadcast Single Frequency Network) subframe.

The MBSFN subframe may indicate a specific subframe through which CRS and PDCCH are transmitted in a control region (See FIG. 3) whereas no signal is transmitted in a data region (for example, CRS and PDSCH are not transmitted at least). Information regarding MBSFN configuration (or MBSFN pattern) of a certain cell may be provided in advance to the UE through a system information block (SIB).

If the modified CIF is used as a field for indicating the CRS position to be assumed in PDSCH demodulation, a cell (or a cell-set) indicated by the modified CIF may be different from a cell (or a cell-set) that performs actual PDSCH transmission. For example, if PCell and $1^{st}$ SCell perform CoMP JT using a DMRS, if it is assumed that the $1^{st}$ SCell determines a specific subframe to be an MBSFN subframe, this means that only CRS of PCell is present in the data region within the corresponding subframe. In this case, the network may establish the above modified CIF in the same manner as in the case in which PCell transmits a PDSCH alone, such that the UE can correctly assume CRS overhead (i.e., REs occupied by CRS or the number of REs) in a subframe established as the MBSFN subframe by the $1^{st}$ SCell. Therefore, the UE assumes that only CRS of PCell is present as indicated by the modified CIF contained in a PDCCH DCI including scheduling information of a PDSCH transmitted in a subframe configured as an MBSFN subframe by $1^{st}$ SCell, and the rate matching pattern of PDSCH can be correctly decided.

Alternatively, although the $1^{st}$ SCell informs a UE of specific information indicating that PCell and $1^{st}$ SCell simultaneously participate in transmission in association with a PDSCH scheduled in a subframe configured as an MBSFN subframe (i.e., if the modified CIF indicates the CRS position of the PCell and $1^{st}$ SCell), since specific information indicating a subframe established as an MBSFN by the $1^{st}$ SCell has already been transferred to the corresponding UE through an SIB, the UE may estimate and assume the fact that CRS belonging to PCell only is present in the data region, so that the PDSCH rate-matching pattern can be correctly decided.

Embodiment 5

Embodiment 5 relates to a method for allowing a UE to utilize information applied to the UE using the modified CIF.

For example, specific information indicated by the modified CIF may be preferably utilized for UE interference measurement. For example, if the modified CIF indicates that PCell and $1^{st}$ SCell simultaneously transmit a PDSCH, the UE removes a CRS of each cell from CRS RE of the PCell and $1^{st}$ SCell, and the fact that interference observed by the corresponding RE corresponds to interference from the remaining cells other than the PCell and 1$^{st}$ SCell can be estimated. In case that PCell and 1$^{st}$ SCell perform JT on the basis of the above-mentioned estimation result, it may be possible to more correctly estimate CSI and to report the estimated result to the network.

In another example, the UE may assume that information regarding the CRS position indicated by the modified CIF is valid only in PDSCH but is invalid in PDCCH. That is, in association with the PDSCH, PDSCH demodulation may be carried out in consideration of the CRS position of multiple cells (for example, the CRS positions of all the cells may be considered, and the CRS position of the corresponding cell is not considered in a subframe established as an MBSFN within some cells). However, since PDCCH is always transmitted on PCell only, the UE assumes the presence of only a CRS of PCell (i.e., the presence of a PDCCH in CRS RE of SCell) so that the UE may demodulate a PDCCH.

Figure 11:
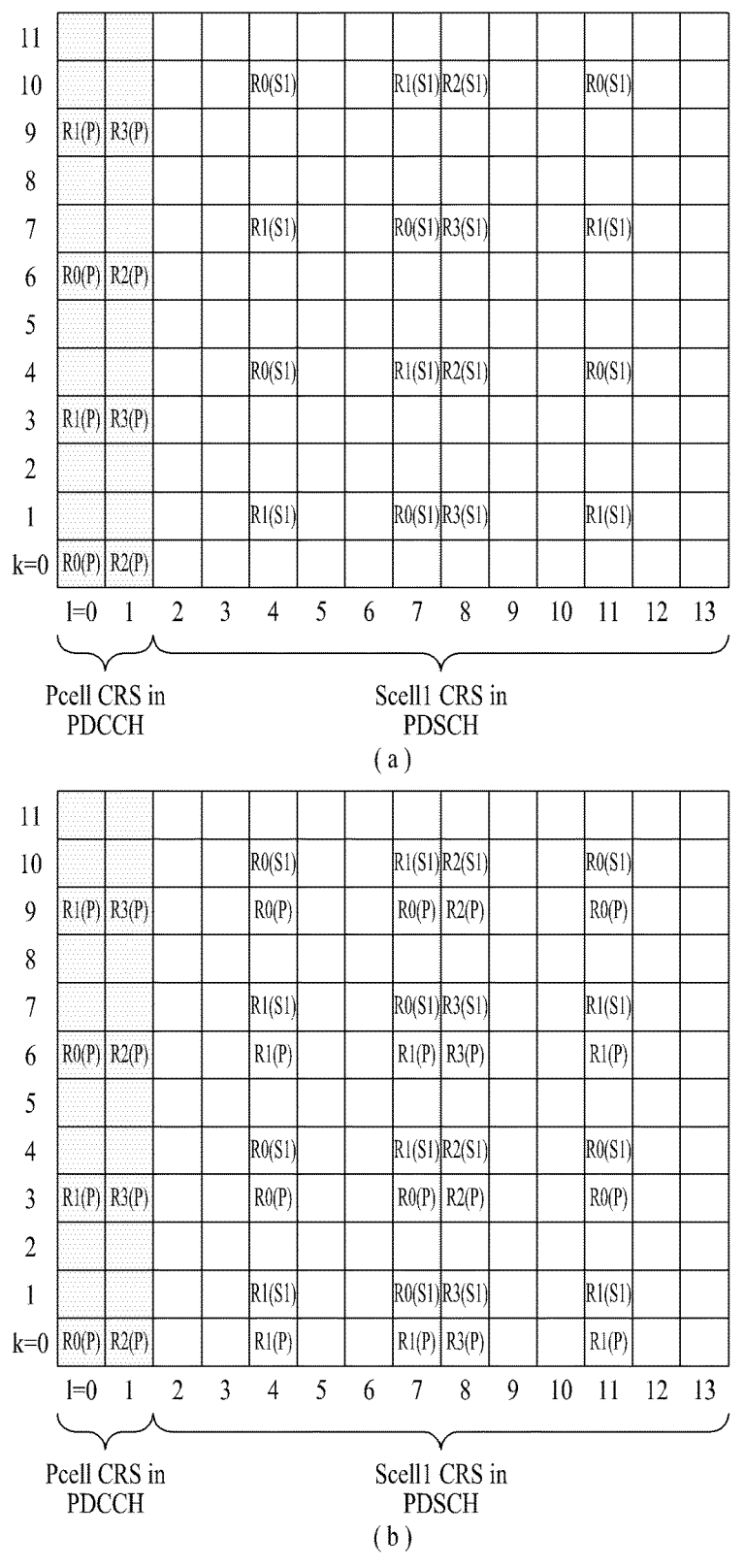

FIG. 11 is a conceptual diagram illustrating CRS overhead for use in physical channel demodulation according to the embodiment.

In FIG. 11, each of PCell (denoted by (P) of FIG. 11) and 1$^{st}$ SCell (denoted by (S1) of FIG. 11) includes four CRS ports (i.e., antenna ports 0, 1, 2, 3). It is assumed that each of PCell and 1$^{st}$ SCell is a subframe established as a normal subframe (i.e., non-MBSFN subframe), and the value of V$_{shift}$ indicates that a difference between PCell and 1$^{st}$ SCell is denoted by one subcarrier.

FIG. 11(a) exemplarily shows that 1$^{st}$ SCell (denoted by S1 of FIG. 11) transmits a PDSCH alone. As can be seen from FIG. 11(a), only CRS (R0(P), R1(P), R2(P) and R3(P)) of PCell is present in a specific region corresponding to OFDM symbols #0 and #1 used for PDCCH transmission, and PCell does not participate in PDSCH transmission within a region corresponding to OFDM symbols #2~#13 used for PDSCH transmission, so that only CRS (R0(S1), R1(S1), R2(S1) and R3(S1)) of the 1$^{st}$ SCell may be present. In this case, the modified CIF information applied to the UE may indicate the CRS position of the 1$^{st}$ SCell as "CRS position to be assumed in PDSCH demodulation). The UE may interpret that the modified CIF information is applied only to PDSCH demodulation and is not applied to PDCCH demodulation. That is, the UE may assume that PDCCH is present in the remaining REs other than CRS RE of PCell during PDCCH demodulation. The UE may assume that a PDSCH is present in all the remaining REs other than CRS RE of the 1$^{st}$ SCell during PDSCH demodulation.

FIG. 11(b) exemplarily shows CRS overhead for use in the case that PCell and 1$^{st}$ SCell simultaneously transmit a PDSCH. Referring to FIG. 11(b), only CRS (R0(P), R1(P), R2(P) and R3(P)) of PCell is present in a region corresponding to OFDM symbols #0 and #1 used for PDCCH transmission, and both CRS (R0(P), R1(P), R2(P) and R3(P)) of PCell and CRS (R0(S1), R1(S1), R2(S1) and R3(S1)) of SCell are present in a region corresponding to OFDM symbols #2~#13 used for PDSCH transmission. In this case, the modified CIF information applied to the UE may indicate the CRS position of the 1$^{st}$ SCell as "CRS position to be assumed in PDSCH demodulation). The UE may interpret that the modified CIF information is applied only to PDSCH demodulation and is not applied to PDCCH demodulation. That is, the UE may assume that PDCCH is present in the remaining REs other than CRS RE of PCell during PDCCH demodulation. The UE may assume that a PDSCH is present in all the remaining REs other than CRS RE of the 1$^{st}$ SCell during PDSCH demodulation.

Embodiment 6

Embodiment 6 relates to a method for deciding reference signal(s) RS(s) used for PDSCH demodulation.

In the legacy wireless communication system in which PDSCH is transmitted by a single cell, during a downlink Tx mode (e.g., Tx mode 9) in which PDSCH demodulation based on DMRS (or UE-specific RS) is configured, a PDSCH may be scheduled using DCI format 1A for a fallback usage. In association with a PDSCH scheduled using DCI format 1A, it is preferable that the PDSCH is demodulated using a CRS within a non-MBSFN subframe including a CRS, and it is also preferable that the PDSCH is demodulated using a DMRS instead of a CRS within an MBSFN subframe in which no CRS is present in a PDSCH region.

However, if the cell participating in PDSCH transmission is dynamically changed as described above, there may be ambiguity in deciding a reference signal used in PDSCH demodulation. For example, if a specific subframe is used as an MBSFN subframe from the viewpoint of PCell and is used as a non-MBSFN subframe from the viewpoint of 1$^{st}$ SCell, information regarding the fact that only the 1$^{st}$ SCell transmits a PDSCH may be transferred to the UE through a CIF (or the modified CIF) contained in DCI format 1A. The UE having received the above information is unable to definitely decide whether to perform PDSCH demodulation using a DMRS on the assumption that the corresponding subframe is used as the MBSFN subframe, or is also unable to definitely decide whether to perform PDSCH demodulation using a CRS on the assumption that the corresponding subframe is used as the non-MBSFN subframe.

The present invention proposes various methods for deciding a reference signal to be used by a UE for PDSCH demodulation so as to address the above-mentioned ambiguity or obscurity.

In a first method, a reference signal to be used for PDSCH demodulation may be determined according to the MBSFN subframe configuration of PCell. That is, it is possible to define a specific rule indicating that DMRS is used in the MBSFN subframe of PCell, and CRS is used in the non-MBSFN subframe of PCell. According to the first method, a decision reference of a reference signal (RS) used by the UE is fixed to PCell, so that the influence caused by a variation in MBSFN configuration of each cell is relatively low in the multi-cell environment. If the corresponding subframe is used as an MBSFN subframe of PCell of a certain subframe and is also used as a non-MBSFN subframe of the 1$^{st}$ SCell, and if the modified CIF indicates a CRS RE of 1$^{st}$ SCell as the CRS position to be assumed in PDSCH demodulation, the UE must use a DMRS during PDSCH demodulation, and assumes that the corresponding PDSCH is not mapped to a CRS RE of the 1$^{st}$ SCell, so that the UE has to perform PDSCH demodulation.

In a second method, a reference signal (RS) to be used for PDSCH demodulation may be decided according to the MBSFN subframe configuration of a cell used for PDSCH transmission. For example, if the corresponding subframe is used as an MBSFN subframe of PCell of a certain subframe and is also used as a non-MBSFN subframe of the 1$^{st}$ SCell, CIF (or the modified CIF) may indicate that PDSCH transmission is performed only in the 1$^{st}$ SCell. In this case, if a subframe used for PDSCH transmission is an MBSFN fubrame of the 1$^{st}$ SCell, the UE may use a DMRS. If a subframe used for PDSCH transmission is a non-MBSFN subframe of the 1$^{st}$ SCell, PDSCH demodulation may be carried out using the CRS. According to the second method, a reference signal (RS) to be used for PDSCH demodulation is decided according to the MBSFN subframe configuration of the cell used for actual PDSCH transmission, so that the second method can more flexibly decide the reference signal (RS).

In association with the above-mentioned methods, if two or more cells participate in transmission, priority may be assigned to each cell, and a reference signal to be used for PDSCH demodulation may also be decided according to the MBSFN subframe configuration of the highest-priority cell from among a plurality of cells participating in actual transmission. DMRS may be used in an MBSFN subframe having the highest-priority cell, and CRS may be used in a non-MBSFN subframe having the highest-priority cell, such that PDSCH demodulation can be carried out. This priority may be predetermined in the order of PCell>$1^{st}$ SCell>$2^{nd}$ SCell> . . . .

In association with the above methods, under the condition that CIF (or the modified CIF) actually indicates cell(s) participating in PDSCH transmission, CIF is not contained in DCI format 1A, and DCI format 1A may indicate that only PCell can always schedule a PDSCH participating in transmission. The above-mentioned methods may be advantageous in that the methods can prevent the occurrence of complexity of the operation for deciding the reference signal (RS) as in the above first to third methods. Specifically, the number of bits of DCI format 1A can be reduced, so that the PDCCH decoding error can be effectively reduced.

For example, in case of using the first method, SCell (or a cell configured not to perform PDSCH scheduling) can perform PDSCH transmission using a DMRS in the MBSFN subframe of PCell (or a serving cell configured to schedule PDSCH), PDSCH can be transmitted using the modified CIF (or information indicating the CRS position to be assumed in PDSCH demodulation). However, in case of using the first method, PDSCH transmission must be performed using a CRS of PCell within the non-MBSFN subframe of PCell, such that SCell cannot participate in PDSCH transmission.

Therefore, according to the first method, the CIF (or information indicating the CRS position to be assued in PDSCH demodulation) may not be added to DCI in a subframe not used as the MBSFN subframe from the viewpoint of PCell (or a serving cell configured to schedule a PDSCH). Alternatively, in case of using the above first method, although information indicating the CRS position to be assumed in PDSCH demodulation is signaled to the UE in the non-MBSFN subframe of PCell (or a serving cell configured to schedule a PDSCH), the CRS position of PCell can be assumed irrespective of the signaled CRS position, so that the above PDSCH can be demodulated.

Embodiment 7

Embodiment 7 relates to a method for deciding assumption of E-PDCCH resource allocation (or assumption of the E-PDCCH rate-matching pattern) for E-PDCCH demodulation.

DCI including PDSCH scheduling information or the like may also be transmitted through an E-PDCCH transmitted using a DMRS (or a UE-specific RS) in a data region (See FIG. 3) of a DL subframe as described above. In order to demodulate E-PDCCH, correct assumption of resource allocation of E-PDCCH is needed. A method for the above assumption is not present in the conventional art, so that the present invention proposes various methods for deciding assumption of E-PDCCH resource allocation when E-PDCH is transmitted in a multi-cell environment.

In accordance with the first method, the UE may assume that E-PDCCH is allocated in consideration of CRS overhead of PCell. For example, even when multiple cells perform the CoMP operation, the UE may assume that E-PDCCH is mapped to the remaining position other than the CRS RE position of PCell (i.e., the presence of E-PDCCH in CRS RE of another cell is assumed), so that E-PDCCH can be demodulated. As a result, the first method can be more beneficial in terms of reduction of complexity in deciding the E-PDCCH rate-matching pattern.

In accordance with the second method, the UE may assume that E-PDCCH is allocated in consideration of CRS overhead of all cells, each of which may have a possibility that the UE will participate in CoMP. For example, if plural cells perform PDSCH transmission, it is assumed that E-PDCCH is mapped to the remaining resources other than a union of each CRS RE of each of the cells, so that E-PDCCH can be demodulated. If each CRS transmission pattern (e.g., MBSFN subframe configuration of each cell) of the cells is signaled to the UE through higher layer signaling (e.g., RRC signaling), it is assumed that E-PDCCH is mapped to CRS RE of a corresponding specific cell in the MBSFN subframe (i.e., a subframe through which a specific cell does not transmit a CRS in a PDSCH region) of the specific cell, so that E-PDCCH demodulation can be carried out.

In addition, in case of E-PDCCH or E-PHICH configure to perform cross interleaving of an REG (or EREG) level, a time-variant change of the CRS pattern of the cell participating in CoMP may affect definition of REG (or EREG). Therefore, the UE may demodulate E-PDCCH or E-PHICH on the assumption that E-PDCCH or E-PHICH is not mapped to the potential CRS position of the cells that always participate in CoMP irrespective of the MBSFN subframe pattern.

Embodiment 8

Embodiment 8 relates to a method for signaling timing reference information configured to demodulate a physical channel transmitted in a multi-cell environment.

The above-mentioned examples of the present invention have proposed various methods for informing a CoMP UE of either information (i.e., CRS position of the corresponding cell, scrambling parameter, etc.) of a cell used for PDSCH transmission or information of SCell participating in the CoMP operation using the modified CIF information. In addition, this embodiment proposes a method for informing a UE of timing reference information for PDSCH demodulation using the modified CIF information.

In addition, this embodiment proposes a method for deciding a specific cell to be used as a timing reference of PDSCH transmission when one UE can receive the PDSCH. In other words, PDSCH Tx timing point of a specific cell from among a plurality of cells participating in the CoMP operation may represent PDSCH Tx timing of the remaining cells, the UE assumes that the PDSCH Tx timing of the remaining cells is identical to PDSCH Tx timing of the specific cell, so that PDSCH demodulation can be carried out. In addition, the operation for deciding the timing reference of PDSCH transmission may indicate that delay spread (or Doppler spread or Doppler delay) for use in channel estimation is decided. In addition, the operation for deciding a timing reference of PDSCH transmission may measure the delay spread (or Doppler spread or Doppler delay), or may have the same meaning as in an operation for deciding a specific cell to be measured (e.g., the CRS position of the specific cell). Accordingly, the delay spread (or Doppler spread or Doppler delay) of a specific cell from among a plurality of cells participating in the CoMP operation may also be applied to the delay spread (or Doppler spread or Doppler delay) of the remaining cells. The embodiments of the present invention propose a method for deciding the above-mentioned specific cell.

For example, a CIF (or the modified CIF) may indicate whether a Tx timing point of a certain cell will be used as a timing reference of PDSCH demodulation. In this case, the timing reference may be Primary Synchronization Signal (PSS)/Secondary Synchronization Signal (SSS), CRS, tracking RS, etc. of the cell indicated by the CIF. In other words, it is assumed that a cell (or Tx point) indicating that PDSCH is transmitted in a multi-cell environment is identical to a cell (or Tx point) configured to transmit a timing reference signal of the PDSCH demodulation. For example, as can be seen from the above-mentioned examples of the present invention, if the CIF indicates PDSCH transmission caused by a specific cell, the UE may determine the corresponding cell (i.e., a cell in which PDSCH is transmitted) to be a timing reference.

In this case, if a CIF indicates that plural cells simultaneously transmit a PDSCH (e.g., CoMP JT operation), there may be ambiguity in the process for determining a certain cell from among the plurality of cells to be a timing reference. Accordingly, a method for deciding a cell to be used as a timing reference from among a plurality of cells is needed. In association with the above description, the present invention proposes the following methods.

In accordance with a first method, PCell from among a plurality of cells may always be used as a timing reference.

In accordance with a second method, if a cell in which PDSCH transmission is performed is indicated by a CIF (or the modified CIF), the indicated cell may be determined to be a timing reference. That is, the cell (or a Tx point or a cell ID) indicated by the CIF (or the modified CIF) is determined to be the timing reference, and the PDSCH rate-matching pattern may be determined in consideration of CRS overhead of the corresponding cell.

In accordance with a third method, priority may be assigned to a cell (or Tx point) capable of being used as a timing reference, and the highest-priority cell from among a plurality of cells participating in actual PDSCH transmission may be determined to be a timing reference. In this case, priority may be decided in advance, and may be pre-signaled to the UE through separate higher layer signaling (e.g., RRC signaling) or the like.

In accordance with a fourth method, the network may determine a specific cell as a timing reference irrespective of whether the network participates in current PDSCH transmission, and may inform the UE of a cell to be used as the timing reference through higher layer signaling. In this case, signaling information for indicating this timing reference may be composed of a CIF (or the modified CIF) and independent signaling information, or may indicate a specific cell corresponding to the timing reference using only some states of the CIF (or the modified CIF).

In this case, as can be seen from Embodiment 4, if the modified CIF is used as "a field for indicating the CRS position to be assumed in PDSCH demodulation", a cell (or a cell-set) indicated by the modified CIF may be different from a cell (or a cell-set) configured to perform actual PDSCH transmission. Therefore, the CRS position to be assumed for PDSCH demodulation by the UE may be signaled to the UE by the modified CIF, and the CRS position (or a specific cell corresponding to the timing reference, or the CRS position of a specific cell to be used as a measurement target of Doppler spread) of the cell used for PDSCH transmission may be signaled to the UE through separate signaling instead of the modified CIF.

In accordance with a fifth method, if multiple cells participate in PDSCH transmission in the same manner as in CoMP JT, CoMP JT may assume that timing points of individual cells are present in an allowable error range, and a UE may arbitrarily select a timing reference from among the plural cells (or collaborative cells).

Embodiment 9

Embodiment 9 relates to a method for signaling physical channel Tx power information needed for demodulating a physical channel transmitted in a multi-cell environment.

Embodiment 9 proposes a method for indicating the ratio of Tx power of CRS RE to Tx power of PDSCH RE using the modified CIF information (or information indicating the CRS position to be assumed in PDSCH demodulation) proposed by the present invention.

Figure 12:
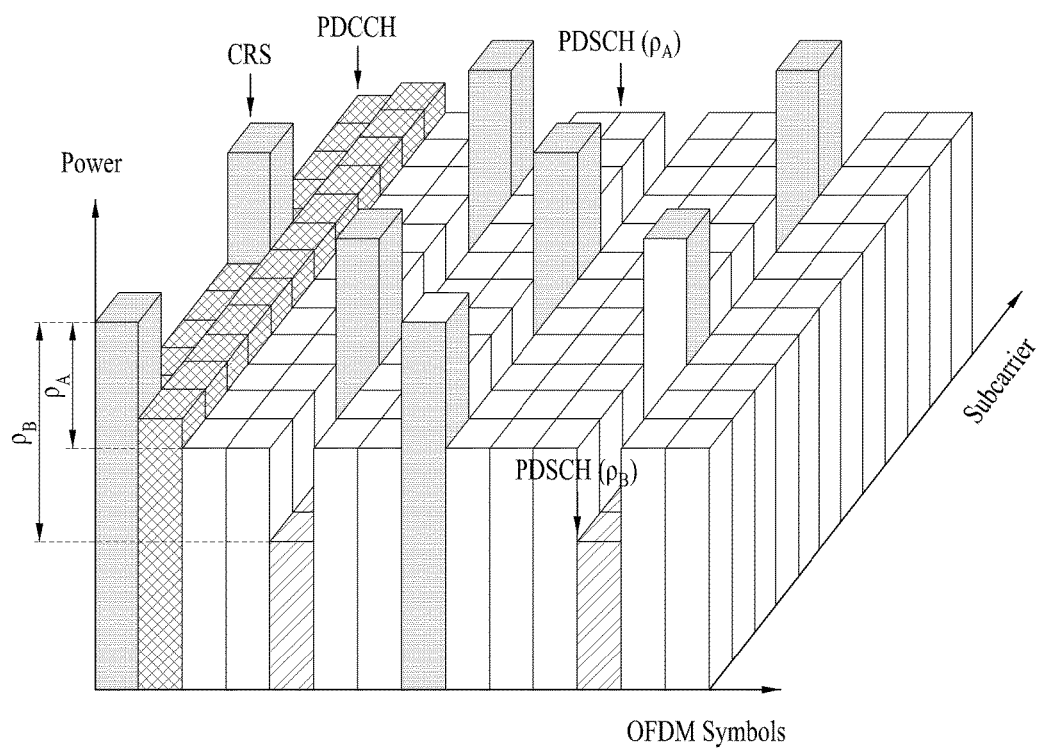
FIG. 12 is a conceptual diagram illustrating a method for allocating power to individual resource elements contained in a downlink subframe.

FIG. 12 is a conceptual diagram illustrating a method for allocating power to individual resource elements contained in a downlink subframe.

In FIG. 12, an X axis may denote an OFDM symbol, a Y axis may denote a subcarrier, and a Z axis may denote Tx power.

A base station (BS) (or eNB) may determine Tx power allocation of DL resources to be an energy value of each RE. A reference of Tx power allocation of DL resources is Energy Per Resource Element (EPRE) regarding a CRS. EPRE of a PDSCH resource region in which actual data is transmitted is represented by the ratio of CRS to EPRE. For example, the ratio of PDSCH EPRE to CRS EPRE is defined as $\rho_A$ within the OFDM symbol duration in which CRS is not present on a time axis of a downlink subframe, and the ratio of PDSCH EPRE to CRS EPRE is defined as $\rho_B$ within the OFDM symbol duration including the CRS.

For measurement, CRS is used not only by all UEs of the cell, but also by UEs of a neighbor cell, so that Tx power of a CRS RE is generally higher than Tx power of the remaining REs of the corresponding OFDM symbol so as to increase the accuracy of measurement. (Alternatively, CRS RE may have higher power upon receiving power values of the remaining other REs). This operation is referred to as CRS power boosting. If power of the CRS RE is boosted, power of the PDSCH RE is reduced in the corresponding OFDM symbol. In this case, in order to correctly demodulate a Quadrature Amplitude Modulation (QAM) signal in which information is also loaded on a signal amplitude, the UE must recognize in advance a PDSCH power value at an OFDM symbol including a CRS. Of course, the PDSCH power value at an OFDM symbol including a CRS may be different from PDSCH power at an OFDM symbol including no CRS, so that the UE must recognize both of two values so as to demodulate a QAM signal. Generally, the BS (or eNB) may provide a UE with information regarding a PDSCH power value through higher layer signaling such as RRC signaling. For example, a UE-specific parameter ($P_A$) for deciding the above value ($\rho_A$) may be provided to the UE through higher layer signaling, and a cell-specific parameter ($P_B$) for deciding $\rho_B/\rho_A$ may be provided to the UE through higher layer signaling.

As described above, under the CoMP situation in which the cell for PDSCH transmission may be dynamically changed, a cell participating in PDSCH transmission may be changed every time. Since each cell has unique PDSCH RE Tx power configuration, the UE must recognize the power ratio of CRS RE to PDSCH RE (i.e., $\rho_A$ and $\rho_B$ of FIG. 12) so as to correctly demodulate a PDSCH, where the power ratio is applied to each subframe.

For this purpose, the present invention proposes a method for indicating the power ratio of CRS RE to PDSCH RE using the modified CIF information (or information indicating the CRS position to be assumed in PDSCH demodulation). If the cell participating in PDSCH transmission is changed to another cell, there is a very high possibility that the CRS position will be changed, so that a method for indicating the CRS-to-PDSCH RE power ratio in response to the modified CIF information proposed by the present invention is considered most appropriate. For example, through higher layer signaling such as RRC signaling, if the modified CIF information is indicated as a specific status, the BS (or eNB) may pre-indicate the power ratio of CRS RE to PDSCH RE to be assumed by the UE during PDSCH demodulation. That is, the mapping relationship between a status value of the modified CIF information and the CRS-to-PDSCH RE power ratio is indicated in advance, and the UE having received the CIF may decide the CRS-to-PDSCH power ratio indicated by the resultant value.

Accordingly, the UE reads a status value of the modified CIF value at every subframe, assumes the presence of CRS in RE indicated by the read CIF value (i.e., assuming that PDSCH is not mapped to RE that assumes the presence of CRS), and at the same time the CRS-to-PDSCH RE power ratio mapped to the read CIF value, such that the corresponding PDSCH can be demodulated. As described above, information regarding the CRS RE position needed for PDSCH demodulation and information regarding the CRS-to-PDSCH RE power ratio are signaled using the same indication information (e.g., the modified CIF information), so that signaling overhead of a control channel can be reduced.

In this case, the values of $\rho_A$ and $\rho_B$ may be directly signaled as information regarding the CRS-to-PDSCH RE power ratio. Alternatively, the information regarding the CRS-to-PDSCH RE power ratio may be provided as the value of $\rho_B/\rho_A$. For example, if information regarding the CRS-to-PDSCH RE power ratio is provided as the value of $\rho_B/\rho_A$, this information may be more appropriately used for the case in which PDSCH is demodulated into UE-specific RS (or DMRS) instead of CRS. If PDSCH is demodulated on the basis of UE-specific RS, CRS is not directly used for PDSCH demodulation, so that information regarding the CRS-to-PDSCH RE power relationship is not always needed. In contrast, the relationship between PDSCH power of an OFDM symbol including a CRS and PDSCH power of an OFDM symbol including no CRS is needed for QAM demodulation.

In this case, a reference CRS for calculating the PDSCH Tx power using the CRS-to-PDSCH RE power ratio needs to be a specific CRS that exists at the position indicated by the modified CIF information (or information indicating the CRS position). For example, a specific CRS used as a reference may be different from a CRS of the serving cell (or PCell). In this case, this different CRS may include a CRS of a cell having a cell ID different from that of a CRS of the serving cell, a CRS having a different antenna port number, a CRS having a different RE position, etc.

If the same CRS-to-PDSCH RE power ratio is given at two different CRS RE position, the UE must decide the PDSCH power according to the indicated CRS-to-PDSCH RE power ratio on the basis of a CRS corresponding to the indicated CRS RE position. That is, if a reference CRS for allowing the UE to decide PDSCH Tx power is not identical to a CRS of the serving cell, the PDSCH Tx power may be considered more variable than the CRS Tx power of the serving cell. In addition, on the basis of the CRS RE position indicated at the corresponding time, it is determined that the CRS power boosting effect is applied to an OFDM symbol (i.e., an RE-included OFDM symbol on the assumption that PDSCH is not mapped to RE) including a CRS (i.e., in case of using $\rho_B$ shown in FIG. 12), so that the PDSCH Tx power can be calculated. In addition, it is determined that the CRS power boosting effect is not applied to an OFDM symbol (i.e., an OFDM symbol having no RE on the assumption that PDSCH is not mapped to RE) including no CRS (i.e., in case of using $\rho_A$ shown in FIG. 12, so that the PDSCH Tx power can be calculated.

In addition, although the CRS REs have the same position (or although the PDSCH Tx cells indicated by a CIF are identical to each other), different CRS-to-PDSCH RE Tx power ratios may be used, and associated description thereof will hereinafter be described with reference to FIG. 13.

Figure 13:
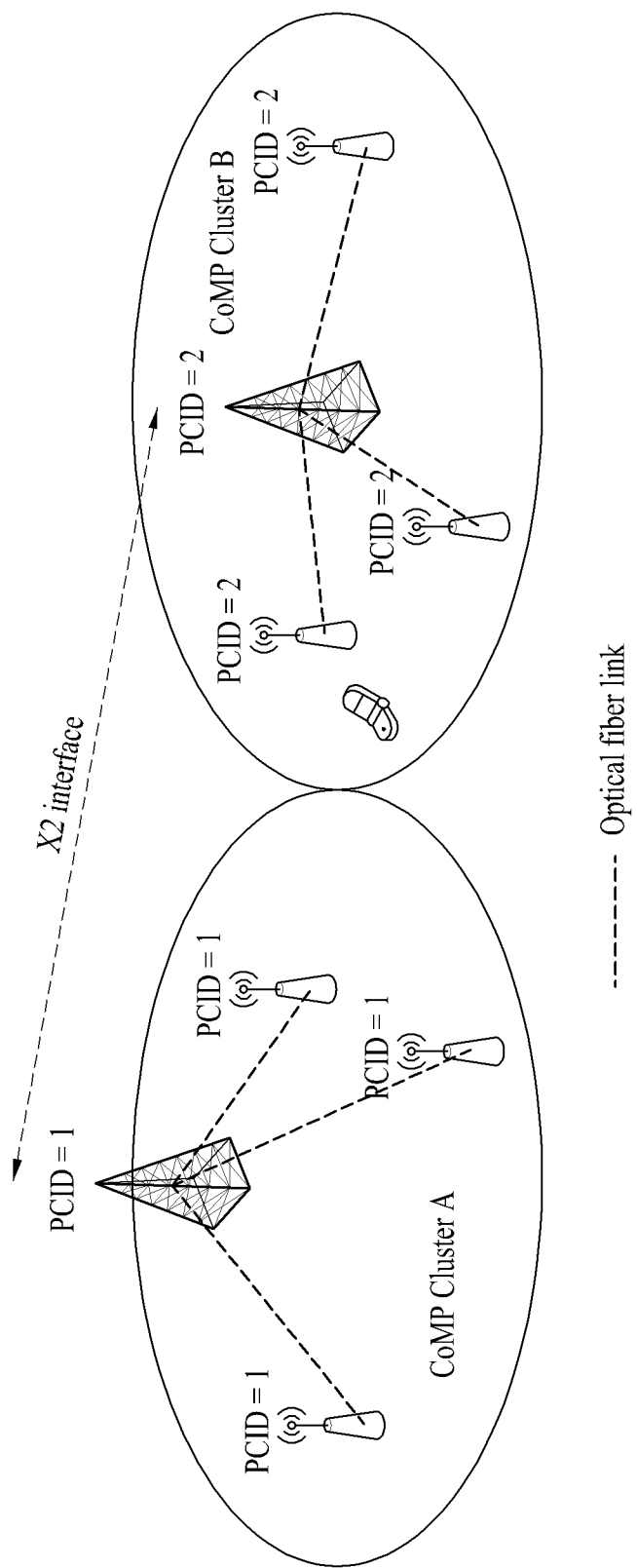
FIG. 13 is a conceptual diagram illustrating an exemplary CoMP scenario to which the present invention can be applied.

FIG. 13 is a conceptual diagram illustrating an exemplary CoMP scenario to which the present invention can be applied. FIG. 13 shows an example in which a plurality of Tx points sharesone physical cell ID (PCID) and forms a CoMP cluster so as to perform the CoMP operation. For example, CoMP Cluster A of FIG. 13 includes 4 Tx points (i.e., one macro RRH (remote radio head) and three pico RRHs) sharing "PCID=1", and CoMP Cluster B of FIG. 13 includes 4 Tx points (i.e., one macro RRH and three pico RRHs) sharing "PCID=2". Tx points for use in one CoMP cluster are connected by wire (e.g., an optical fiber link), and it may be assumed that a delay between Tx points is substantially zero '0'. In addition, signals and/or data can be communicated through an X2 interface between a cell of PCID=1 (i.e., CoMP Cluster A) and a cell of PCID=2 (i.e., CoMP Cluster B).

In the case in which plural Tx points share one PCID, form a CoMP cluster, and perform the CoMP operation as shown in FIG. 13, although the CRS RE position to be considered (to be excluded) in PDSCH RE mapping is constantly given irrespective of Tx points participating in the CoMP operation, individual Tx points are generally configured to have different Tx power values. Accordingly, the CRS-to-PDSCH RE power ratio may be differently established according to Tx points participating in actual transmission.

In FIG. 13, when a UE receives a PDSCH at CoMP Cluster A, 4 Tx points constructing the CoMP Cluster A are configured to transmit a CRS at the same CRS position, and the CRS power simultaneously transmitted by all Tx points is constantly maintained every subframe. However, according to whether a Tx point participating in PDSCH transmission toward the UE at each subframe is a high-power macro RRH or a low-power pico RRH, or according to whether a Tx point participating in PDSCH transmission is composed of a plurality of Tx points configured to perform JT using a total sum of power, PDSCH RE power received by the UE may be differently established. As a result, a method for indicating which Tx points can participate in actual PDSCH transmission is needed.

Therefore, the present invention proposes a method for mapping the same cell ID (or the same CRS position information) to a plurality of states of specific indication information, and mapping different CRS-to-PDSCH RE power ratios to respective states. This specific indication information may be the modified CIF information proposed by the present invention, and a BS (or eNB) may previously inform the UE of specific information (i.e., the same cell ID and different CRS-to-PDSCH RE power ratios) indicating that each state of the modified CIF information is mapped through higher layer signaling or the like.

FIG. 14 exemplarily shows mapping positions of CRSs of two cells in case of CoMP JT.

FIG. 14 shows the CRS positions of individual cells when the number of CRS ports of one cell (i.e., PCell) is different from the number of CRS ports of the other cell (i.e., 1$^{st}$ SCell), where the two cells (PCell and 1$^{st}$ SCell) participate in the CoMP JT operation. For example, as shown in FIG. 14, PCell includes 4 CRS ports ((R0(P), R1(P), R2(P) and R3(P)), and 1$^{st}$ SCell includes two CRS ports (R0(S1) and R1(S1)). As described above, only a CRS of PCell is present in a PDCCH region, both a CRS of PCell and a CRS of 1$^{st}$ SCell are present in a PDSCH region. The V$_{shift}$ values of PCell and 1$^{st}$ SCell are spaced apart from each other by a specific value corresponding to one subcarrier.

In FIG. 14, whereas only CRS of one cell is present in a specific OFDM symbol (OFDM symbol 8 of FIG. 14), CRSs of two cells are present in other OFDM symbols (OFDM symbols 4, 7, and 11 of FIG. 14). In this case, PDSCH Tx powers at individual OFDM symbols are generally different from one another. Therefore, in order for the UE to correctly estimate Tx power at each RE, information regarding PDSCH power of an OFDM symbol to which CRS of one cell is transmitted, information regarding PDSCH power of an OFDM symbol to which CRSs of two cells are transmitted, and information regarding PDSCH power of an OFDM symbol in which a CRS of a certain cell is not present must be independently signaled to the UE.

For example, a PDSCH Tx power value of an OFDM symbol having a CRS of one cell, a PDSCH Tx power value of an OFDM symbol having CRSs of two cells, and a PDSCH Tx power value (or the Tx power ratio value regarding one of three cases on the basis of a reference CRS Tx power) of an OFDM symbol having no CRS may be signaled to the UE.

In addition, the above information may be configured in the form of the ratio between PDSCH powers described in the above three cases, such that the resultant information may be signaled to the UE. For example, a first ratio value between a PDSCH power of an OFDM symbol in which CRS of one cell is present, and a second ratio value between a PDSCH power of an OFDM symbol including CRSs of two cells and a PDSCH power of an OFDM symbol including no CRS may be signaled to the UE.

In addition, in order to reduce signaling overhead, some parts of the PDSCH power for use in the above-mentioned three cases may be identical as necessary. For example, it is assumed that PDSCH power of an OFDM symbol including CRSs of two cells may be identical to PDSCH power of an OFDM symbol including no CRS. In more detail, PDSCH is mapped only to a relatively smaller number of REs at an OFDM symbol including CRSs of two cells as compared to other OFDM symbols, and power capable of being allocated for PDSCH may be considered sufficient in amount although CRS power is boosted, so that PDSCH power can be allocated on the condition that PDSCH power limitation caused by the CRS boosting is not considered in the same manner as in PDSCH power at an OFDM symbol including no CRS. In this case, PDSCH Tx power information acting as signaling overhead (for example, PDSCH power information of an OFDM symbol including the legacy CRS, and PDSCH power information of an OFDM symbol including no CRS) may be signaled to the UE.

In addition, a method for signaling Tx power information of PDSCH (e.g., CRS-to-PDSCH power ratio) transmitted in a multi-cell environment may map a seed value of a scrambling sequence applied to a reference signal used in PDSCH demodulation to Tx power information (or CRS-to-PDSCH power ratio) of the corresponding PDSCH, a seed value of the scrambling sequence is decided and at the same time a Tx power value of the corresponding PDSCH can be decided.

A scrambling sequence of a reference signal related to PDSCH is differently established between neighbor Tx points, and interference between RSs from different Tx points can be mitigated. If this concept is extended to a plurality of cells participating in CoMP, it is preferable that Tx points participating in CoMP are configured in a manner that different scrambling sequences are applied to RSs related to PDSCH.

For this purpose, through the CoMP operation of two Tx points, two candidates (e.g., one seed per Tx point) of a seed value of the RS scrambling sequence may be pre-signaled to the UE configured to receive a PDSCH. In addition, specific information indicating which value among candidates of this seed value is to be applied may be indicated by information (e.g., the modified CIF information) contained in a PDCCH transmitted to the UE. That is, the UE can recognize specific information as to whether a reference signal generated by a certain seed value will be used at a specific time of PDSCH reception. In this case, the seed value indicated through a PDCCH may indicate Tx points participating in PDSCH transmission. Therefore, the CRS-to-PDSCH power ratio value is mapped to each of the candidates of the seed value of the RS scrambling sequence. If this mapping relationship is signaled to the UE in advance, the UE configured to receive a seed value (or Tx point ID information) through a PDCCH can determine which one of the CRS-to-PDSCH power ratios will be applied. Therefore, the UE may decide a scrambling sequence of a reference signal used in PDSCH demodulation on the basis of the decided seed value, decide which Tx point will participate in PDSCH transmission, and decide the PDSCH Tx power.

In order to simplify the operations of a UE configured to decide one of the CRS-to-PDSCH power ratios according to the CRS RE position information, it may be assumed that the same CRS-to-PDSCH power ratio is commonly applied to all CRS RE positions. In other words, resources through which all cells participating in CoMP participate in QAM-based PDSCH transmission toward the corresponding UE may be limited to have the same CRS-to-PDSCH power ratio. In this case, the CRS-to-PDSCH power ratio, i.e., PDSCH based on a UE-specific RS, may restrictively indicate the ratio of the PDSCH power of an OFDM symbol having a CRS and the PDSCH power ratio of an OFDM symbol having no CRS. In this case, the proposed common CRS-to-PDSCH power ratio value may be defined as a legacy signaled power ratio value for the serving cell (or PCell), or a new additional power ratio value may also be signaled irrespective of the legacy signaled power ratio value. In this case, although the common CRS-to-PDSCH power ratio is used, the CRS position may be changed per cell, such that the RE position at which PDSCH power is decided by the common CRS-to-PDSCH power ratio may be changed according to indication regarding the CRS RE position to be assumed for PDSCH mapping. In addition, if the common CRS-to-PDSCH power ratio is signaled separately from the legacy CRS-to-PDSCH power ratio, the common CRS-to-PDSCH power ratio may be selectively applied only to a PDSCH based on a UE-specific RS, and the legacy signaled CRS-to-PDSCH power ratio may be applied to a PDSCH based on CRS.

In addition, the CoMP UE may assume that CRS power related to all or some of the CRS RE position may not affect PDSCH power (i.e., PDSCH power of an OFDM symbol including a CRS and PDSCH power of an OFDM symbol having no CRS may have the same power). All cells participating in CoMP that is used to transmit a CRS at the corresponding CRS RE position can maintain the same PDSCH Tx power in all OFDM symbols irrespective of inclusion or non-inclusion of CRS, in case of using resources participating in QAM-based PDSCH transmission for the corresponding UE. Therefore, if the CRS RE position is dynamically changed, complexity encountered when the UE must calculate new PDSCH Tx power for each subframe can be prevented from occurring.

In this case, specific information, that indicates whether a PDSCH RE of an OFDM symbol having a CRS and a PDSCH RE of an OFDM symbol having no CRS have the same power in association with a certain CRS RE position (regarding a CRS transmitted by a cell corresponding to a certain cell ID), can be signaled to the UE. For example, this assumption may be selectively applied to the case in which cells other than PCell (i.e., a serving cell configured to schedule a PDSCH) transmit a PDSCH. Alternatively, this assumption may be selectively applied to the case in which the CRS RE position indicated by the modified CIF indicates a specific status (i.e., the remaining cases other than one case in which the CRS RE position of the serving cell is indicated). Alternatively, this assumption may dynamically indicate the CRS RE position, and may be selectively applied to the case of PDSCH scheduling. For example, the above-mentioned assumption may be selectively applied to the remaining cases other than the case in which CRS-based PDSCH is received from PCell.

Figure 15:
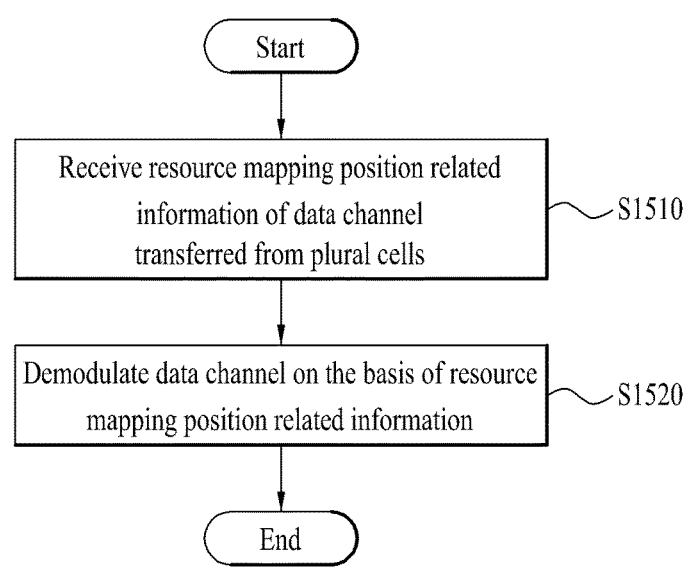
FIG. 15 is a flowchart illustrating an inventive example associated with a physical channel transmitted from a plurality of cells.

FIG. 15 is a flowchart illustrating an inventive example associated with a physical channel transmitted from a plurality of cells.

Referring to FIG. 15, a UE may receive resource-mapping-position related information of a data channel (e.g., PDSCH) transmitted from a plurality of cells through a control channel (e.g., PDCCH). In this case, the data channel is transmitted by collaboration of a plurality of cells, and a cell configured to actually transmit a data channel may be one or more cells from among the plurality of cells.

Information related to the data channel resource mapping position may correspond to the modified CIF information proposed by the present invention. For example, this data channel resource mapping position related information may indicate information needed for PDSCH demodulation. In more detail, the resource mapping position related information (or the modified CIF information) may indicate one or more combinations of ID information of a cell configured to transmit a PDSCH, the CRS RE position (i.e., the position of an RE not mapped to PDSCH, or the PDSCH rate matching pattern), a seed value of the scrambling sequence of PDSCH, a seed value of sequence generation of a reference signal used for PDSCH demodulation, a PDSCH timing reference, and PDSCH Tx power information. In addition, the mapping relationship between a status of the resource mapping position related information (or the modified CIF information) and a detailed content of the above exemplary information may be predefined, and the BS (or eNB) may previously inform the UE of the above information through higher layer signaling. Detailed description of individual exemplary information may refer to the above-mentioned embodiments of the present invention.

Referring to FIG. 15, the UE may demodulate the data channel (e.g., PDSCH) on the basis of the resource mapping position related information in step S1520.

In this case, the reference signal (RS) used in PDSCH demodulation may be decided according to proposals shown in Embodiment 2. As a representative example, if a DL subframe through which PDSCH is transmitted from one or more cells is an MBSFN subframe of PCell, the PDSCH may be demodulated on the basis of a UE-specific RS (or DMRS). If the DL subframe is a non-MBSFN subframe of PCell, PDSCH may be demodulated on the basis of a cell-specific RS (i.e., CRS).

Although FIG. 15 has exemplarily disclosed a method for receiving/demodulating a physical channel from a plurality of cells from the viewpoint of a UE, the same principles may also be applied to the BS (or eNB) operations without departing from the scope or spirit of the present invention. For example, one of multiple cells that collaboratively transmit a physical channel to the UE may provide the resource mapping position related information of PDSCH to the UE. One or more cells may collaboratively transmit PDSCH to the UE. In this case, resource allocation information of PDSCH that is transmitted by collaboration of the one or more cells may be established according to the resource mapping position related information applied to the UE.

The above-mentioned method for receiving/demodulating a physical channel from a plurality of cells as shown in FIG. 15 may be implemented such that above described various embodiments of the present invention may be independently applied or two or more embodiments thereof may be simultaneously applied and a repeated description is omitted for clarity.

In addition, although the above-mentioned various embodiments of the present invention have exemplarily disclosed the BS acting as a DL transmission entity and the UE acting as a UL transmission entity, the scope or spirit of the present invention is not limited thereto, and it is obvious to those skilled in the art that the principle proposed in the present invention can also be applied to an arbitrary DL transmission entity (BS or RN) and an arbitrary DL reception entity (UE or RN) without departing from the spirit or scope of the invention. For example, proposed contents related to DL transmission from the BS to the RN may also be equally applied to DL transmission from the BS to the UE or from the RN to the UE. In conclusion, the principles of the present invention can also be applied to the above-mentioned embodiment.

Figure 16:
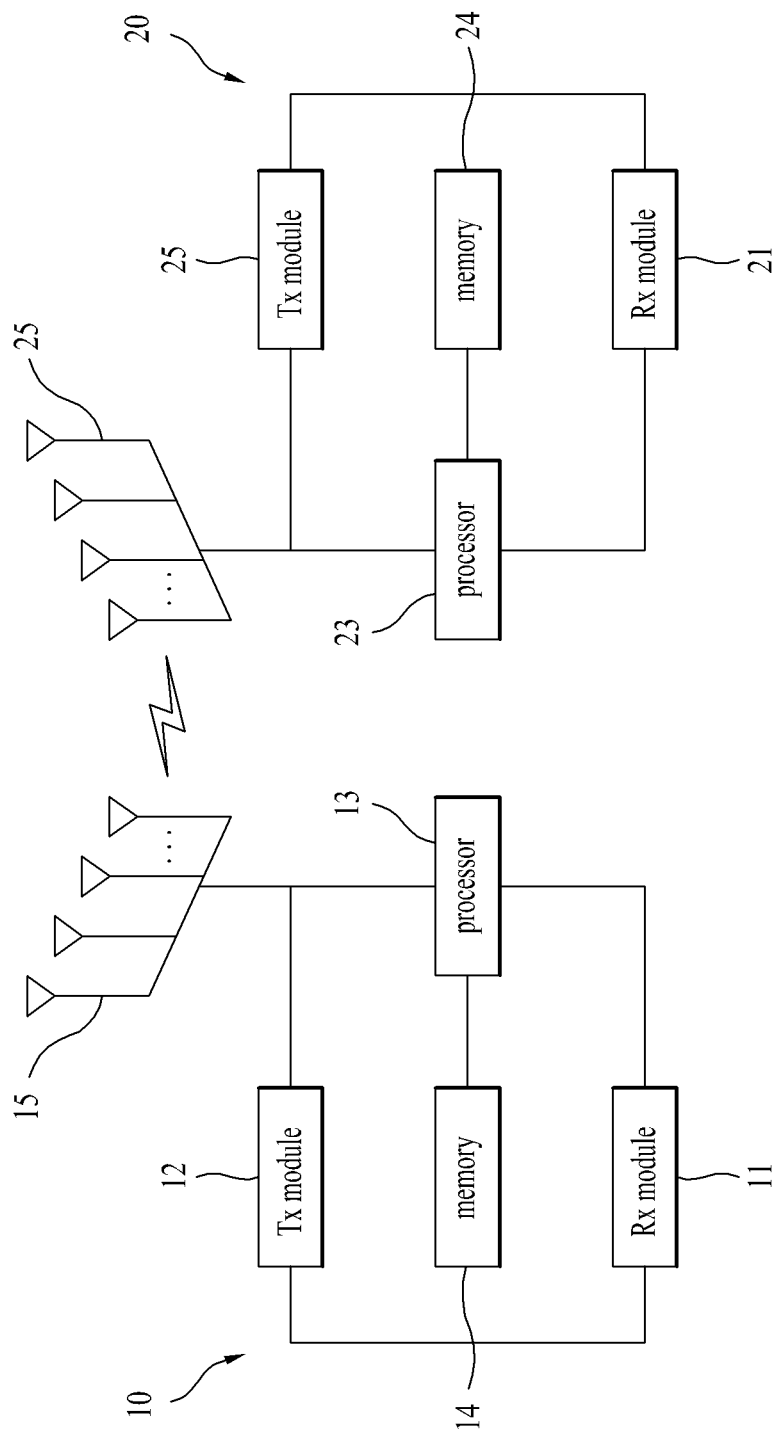
FIG. 16 is a block diagram illustrating a downlink transmit (Tx) device and a downlink receive (Rx) device applicable to embodiments of the present invention.

FIG. 16 is a block diagram illustrating a downlink transmitter and a downlink receiver according to embodiments of the present invention.

Referring to FIG. 16, the downlink transmitter 10 according to the present invention may include a reception (Rx) module 11, a transmission (Tx) module 12, a processor 13, a memory 14, and a plurality of antennas 15. The plurality of antennas 15 indicates a downlink transmitter for supporting MIMO transmission and reception. The reception (Rx) module 11 may receive a variety of signals, data and information on an uplink starting from a downlink receiver 20. The Tx module 12 may transmit a variety of signals, data and information on a downlink for the downlink receiver 20. The processor 13 may provide overall control to the downlink transmitter 10.

The downlink transmitter 10 according to the present invention may be associated with the operations of one of the plurality of cells when a downlink channel is transferred from multiple cells to a UE. The processor 13 may generate the resource mapping position related information (See FIG. 15) regarding a downlink data channel, and may transmit the resultant resource mapping position related information to the downlink receiver 20 using the Tx module 12. In addition, the processor 13 may control the Tx module 12 to transmit data transmitted by collaboration of plural cells on a downlink subframe to the downlink receiver 20 through the above downlink data channel. In this case, the processor 13 may establish resource allocation of the downlink data channel on the basis of the resource mapping location related information of the downlink data channel applied to the downlink receiver 20.

The processor 13 of the downlink transmitter 10 processes information received at the downlink transmitter 10 and transmission information to be transmitted externally. The memory 14 may store the processed information for a predetermined time. The memory 14 may be replaced with a component such as a buffer (not shown).

Referring to FIG. 16, the downlink receiver 20 may include an Rx module 21, a Tx module 22, a processor 23, a memory 24, and a plurality of antennas 25. The plurality of antennas 25 indicates a downlink receiver for supporting MIMO transmission and reception. The Rx module 21 may receive downlink signals, data and information from the downlink transmitter 10. The Tx module 22 may transmit uplink signals, data and information to the downlink transmitter 10. The processor 23 may provide overall control to the downlink receiver 20.

The downlink receiver 20 according to the present invention may be configured to receive a downlink channel from a plurality of cells. The processor 23 may control the Rx module 21 to receive resource mapping position related information of a downlink data channel through a downlink control channel. The processor 23 may control the Rx module 21 to receive data transmitted from multiple cells on a downlink subframe through the downlink data channel. In addition, the processor 23 may be configured to demodulate the downlink data channel on the basis of the resource mapping position related information of the downlink data channel.

The processor 23 of the downlink receiver 20 processes information received at the downlink receiver 20 and transmission information to be transmitted externally. The memory 24 may store the processed information for a predetermined time. The memory 24 may be replaced with a component such as a buffer (not shown).

The specific configurations of the downlink transmitter 10 and the downlink receiver 20 may be implemented such that the various embodiments of the present invention are performed independently or two or more embodiments of the present invention are performed simultaneously. Redundant matters will not be described herein for clarity.

The description of the downlink transmitter 10 shown in FIG. 16 may be applied to a base station (BS), or a relay node (RN) acting as a DL transmission entity or UL reception entity without departing from the scope or spirit of the present invention. In addition, the description of the downlink receiver 10 may be applied to a UE or a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention can be applied to a variety of mobile communication systems.

The invention claimed is:

1. A method for receiving a downlink channel from at least one transmit (Tx) point among a plurality of Tx points by a user equipment (UE), the method comprising:
   receiving, from a first Tx point, information related to a resource mapping position of a downlink data channel, and an indicator which indicates a second Tx point;
   receiving downlink data through cooperative transmission of the first Tx point and the second Tx point,
   wherein the first Tx point is a serving cell and the second Tx point is a neighbor cell; and
   demodulating the downlink data channel, based on whether a downlink subframe of the first Tx point is a Multicast Broadcast Single Frequency Network (MBSFN) subframe or a non-MBSFN subframe,
   wherein, when the downlink subframe is the MBSFN subframe of the first Tx point, the downlink data channel is demodulated based on a UE-specific reference signal of the first Tx point; and
   wherein, when the downlink subframe is the non-MBSFN subframe of the first Tx point, the downlink data channel is demodulated based on a cell-specific reference signal (CRS) of the first Tx point and on an assumption that the downlink channel is not mapped to a resource element (RE) position of a CRS of the second Tx point according to the information related to the resource mapping position of the downlink data channel.

2. The method according to claim 1, wherein the plurality of Tx points are Tx points composed of candidates of data transmission toward the UE.

3. The method according to claim 1, wherein, through higher layer signaling, the UE is established in a Tx mode in which the downlink data channel is demodulated based on a UE-specific reference signal.

4. The method according to claim 1, wherein the information related to the resource mapping position of the downlink data channel is used to demodulate an enhanced-control channel mapped to a data region of the downlink subframe.

5. A user equipment (UE) for receiving a downlink channel from at least one transmit (Tx) point among a plurality of Tx points, the UE comprising:
 a transmitter configured to transmit signals in an uplink channel;
 a receiver configured to receive signals in the downlink channel; and
 a processor configured to:
  control the receiver to receive, from a first Tx point, information related to a resource mapping position of a downlink data channel, and an indicator which indicates a second Tx point,
  control the receiver to receive downlink data through cooperative transmission of the first Tx point and the second Tx point, wherein the first Tx point is a serving cell and the second Tx point is a neighbor cell,
  demodulate the downlink data channel, based on whether a downlink subframe of the first Tx point is a Multicast Broadcast Single Frequency Network (MBSFN) subframe or a non-MBSFN subframe,
 wherein, when the downlink subframe is the MBSFN subframe of the first Tx point, the downlink data channel is demodulated based on a UE-specific reference signal of the first Tx point, and
 wherein, when the downlink subframe is the non-MBSFN subframe of the first Tx point, the downlink data channel is demodulated based on a cell-specific reference signal (CRS) of the first Tx point and on an assumption that the downlink channel is not mapped to a resource element (RE)position of a CRS of the second Tx point according to the information related to the resource mapping position of the downlink data channel.

* * * * *